US009532331B2

(12) United States Patent
Bhaskaran et al.

(10) Patent No.: US 9,532,331 B2
(45) Date of Patent: *Dec. 27, 2016

(54) SYSTEM AND METHOD FOR REDUCING PAGING IN UTRAN/GERAN/E-UTRAN NETWORKS WHEN IDLE SIGNALING REDUCTION IS ACTIVE

(71) Applicant: CISCO TECHNOLOGY, INC., San Jose, CA (US)

(72) Inventors: Sridhar Bhaskaran, Coimbatore (IN); Aditya Prakash, Distt. Hathras (IN); Kartik Raval, Pune (IN); Nirav Salot, Pune (IN); Poojan Tanna, Mumbai (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,188

(22) Filed: Jan. 25, 2016

(65) Prior Publication Data

US 2016/0142999 A1    May 19, 2016

Related U.S. Application Data

(63) Continuation of application No. 13/650,950, filed on Oct. 12, 2012, now Pat. No. 9,247,528.

(51) Int. Cl.
*H04W 68/02* (2009.01)
*H04W 68/12* (2009.01)
(Continued)

(52) U.S. Cl.
CPC ............. *H04W 68/02* (2013.01); *H04W 48/18* (2013.01); *H04W 56/0015* (2013.01);
(Continued)

(58) Field of Classification Search
None
See application file for complete search history.

(56) References Cited

U.S. PATENT DOCUMENTS 8,325,682 B2    12/2012  Hu et al.
8,396,476 B2     3/2013  Thiebaut et al.
(Continued)

FOREIGN PATENT DOCUMENTS

| CN | WO2011157166 A1 | * 12/2011 |
| CN | 103731918 A | 4/2014 |
| EP | 2723130 | 4/2014 |

OTHER PUBLICATIONS

3GPP TR 23.857 v1.9.0 (Aug. 2012) Technical Report: 3rd Generation Partnership project; Technical specification Group Core Network and Terminals; Study of EPC Nodes Restoration; (Release 11), 3GPP, 650 Route des Lucioles—Sophia Antipolis, Valbonne—France, Aug. 2012, 65 pages.
(Continued)

*Primary Examiner* — Hassan Kizou
*Assistant Examiner* — Tejis Daya
(74) *Attorney, Agent, or Firm* — Patent Capital Group

(57) ABSTRACT

Systems and methods are provided for avoiding excessive paging through messaging-based solutions on a mobile network that supports multiple radio access technologies (RATs), such as both Long Term Evolution (LTE) and Global System for Mobile Communications (GSM)/Enhanced Data Rates for GSM Evolution (EDGE)/Universal Mobile Communications System (UMTS) technology, even in situations where the present location of the UE is not known. Preventing paging in access networks where the UE is not present ensures efficient use of radio resources in the paging channel and reduces signaling load on other interfaces. In one embodiment, a user equipment (UE) is simultaneously connected to a Serving General Packet Radio
(Continued)

System (GPRS) Support Node (SGSN) and a Mobility Management Entity (MME). By using signaling between the SGSN and MME, the location of the UE may be tracked without requiring unnecessary paging, even when the UE is in IDLE mode or is inactive.

21 Claims, 18 Drawing Sheets

(51) Int. Cl.
  *H04W 48/18* (2009.01)
  *H04W 56/00* (2009.01)
  *H04W 64/00* (2009.01)
  *H04W 60/00* (2009.01)
  *H04W 88/06* (2009.01)

(52) U.S. Cl.
  CPC ....... *H04W 56/0035* (2013.01); *H04W 64/00* (2013.01); *H04W 68/12* (2013.01); *H04W 60/00* (2013.01); *H04W 88/06* (2013.01)

(56) References Cited

U.S. PATENT DOCUMENTS

| | | | |
|---|---|---|---|
| 8,441,985 B2 | 5/2013 | Kim et al. | |
| 8,520,593 B2 | 8/2013 | Guo et al. | |
| 9,247,528 B2 | 1/2016 | Bhaskaran et al. | |
| 2008/0311913 A1* | 12/2008 | Thiebaut | H04W 36/14 455/436 |
| 2010/0061308 A1* | 3/2010 | Becker | H04W 60/04 370/328 |
| 2010/0220662 A1* | 9/2010 | Di | H04W 76/062 370/328 |
| 2011/0013623 A1* | 1/2011 | Hu | H04W 68/12 370/355 |
| 2011/0090848 A1 | 4/2011 | Kim et al. | |
| 2011/0105153 A1 | 5/2011 | Miklos et al. | |
| 2011/0110308 A1* | 5/2011 | Liang | H04W 60/06 370/328 |
| 2012/0063300 A1* | 3/2012 | Sahin | H04W 36/12 370/225 |
| 2012/0142349 A1* | 6/2012 | Guo | H04W 68/12 455/435.1 |
| 2013/0157661 A1 | 6/2013 | Bhaskaran et al. | |
| 2014/0078890 A1* | 3/2014 | Lu | H04W 24/04 370/221 |

OTHER PUBLICATIONS

"3GPP TS 23.272, v11.1.0 (Jun. 2012) Technical Specification: 3rd Generation Partnership Project; Technical Specification Group Services and System Aspects; Circuit Switches (CS) fallback in evolved packet system (EPS); Stage 2 (Release 11)," 3 GPP, 650 Route des Lucioles—Sophia Antipolis, Valbonne—France, Jun. 2012, 90 pages.
"3GPP TS 23.401 v11.2.0, (Jun. 2012) Technical Specification: 3rd Generation Partnership Project; Technical Specification Group Services and System Aspects; General Packet Radio Service (GPRS) enhancements for Evolved Universal Terrestrial Radio Access Network (E/UTRAN)) access (Release 11)," 3GPP, 650 Route des Lucioles—Sophia Antipolis, Valbonne —France, Jun. 2012, 285 pages.
"3GPP TS 23.401, V11.3.0 (Sep. 2012) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)," 3GPP, 650 Route des Lucioles—Sophia Antipolis, Valbonne—France, Sep. 2012, 283 pages.
"3GPP TS 29.118, v11.3.0 (Jun. 2012) Technical Specification: 3rd Generation Partnership Project; Technical Specification Group Core Network and Terminals; Mobility Management Entity (MME)/ Visitor Location Register (VLr) sGs interface specificiation (Release 11)," 3GPP, 650 Route des Lucioles—Sophia Antipolis, Valbonne—France, Jun. 2012, 65 pages.
"3GPP TS 24.301, V11.3.0 (Jun. 2012) Technical Specification: 3rd Generation Partnership Project; Technical Specification Group Core Network and Terminals; Non/Access/Stratum (NAS) protocol for Evolved Packet System (EPS); Stage 3 (Release 11)," 3GPP, 650 Route des Lucioles—Sophia Antipolis, Valbonne —France, Jun. 2012, 335 pages.
"ETSI TS 122.071 V9.1.0 Technical Specification: Digital cellular telecommunications system (Phase 2+); Universal mobile telecommunications system (UMTS); LTE; Location Services (LCS); Service Description; Stage 1 (3GPP TS 22.071 version 9.1.0 Release 9)," ETSI, 650 Route des Lucioles—Sophia Antipolis, Valbonne—France, Oct. 2010, 51 pages.
"ETSI TS 123 401 V9.8.0 (Mar. 2011)Technical Specification: LTE; General Packet Radio Service (GPRS) enhancements for Evolved Universal Terrestrial Radio Access Network (E-UTRAN) access (3GPP TS 23.401 version 9.8.0 Release 9)," ETSI, 650 Route des Lucioles—Sophia Antipolis, Valbonne—France, Mar. 2011, 120 pages.
EPO Nov. 27, 2014 European Search Report and Written Opinion from European Application Serial No. 13152786.3.
"LTE; General Packet Radio Service (GPRS) enhancements for evolved Unniversal Terrestrial Radio Access Network (E/UTRAN) access (3 GPP TS 23.401 version 9.8.0 Release 9)," (ETSI TS 123 401, v9.8.0), ETSI, Mar. 2011, 141 pages.
"C4-121546: Pseudo/CR on enhancements to the solution 1 for SGW failure: Deactivate ISR state," 3GPP D TSG CT WG4 Meeting #58, Chicago, US; Aug. 6/10, 2012, 2 pages.
PRC May 5, 2016 SIPO $1^{st}$ Office Action from Chinese Application Serial No. 201310061323.7.

* cited by examiner

SYSTEM AND METHOD FOR REDUCING PAGING IN UTRAN/GERAN/E-UTRAN NETWORKS WHEN IDLE SIGNALING REDUCTION IS ACTIVE

RELATED APPLICATION

This Application is a continuation (and claims the benefit of priority under 35 U.S.C. §120) of U.S. application Ser. No. 13/650,950, filed Oct. 12, 2012, entitled "SYSTEM AND METHOD FOR REDUCING PAGING IN UTRAN/GERAN/E-UTRAN NETWORKS WHEN IDLE SIGNALING REDUCTION IS ACTIVE," Inventors Sridhar Bhaskaran, et al. The disclosure of the prior application is considered part of (and is incorporated by reference in) the disclosure of this application.

FIELD OF THE DISCLOSURE

This disclosure relates generally to mobile wireless networking, and specifically to systems and methods for reducing paging of handsets when using idle mode signaling reduction (ISR).

BACKGROUND

In the field of wireless networking, modern mobile stations, such as cell phones or wireless broadband-equipped laptops, typically utilize a radio access network (RAN) to connect to a packet data network (PDN), by which they gain access to hosts on the Internet via Internet Protocol (IP). This connectivity is provided by mobile network operators, which build and maintain networks of radio access points, networking switches and gateways, and high-bandwidth links that are compliant with certain standards. One such standard is called Long-Term Evolution (LTE). Other standards are General Packet Radio System (GPRS) and Universal Mobile Telecommunications System (UMTS). The LTE, UMTS and GPRS standards are published by the 3rd Generation Partnership Project ("3GPP"), a not-for-profit industry consortium.

Mobile stations that provide IP packet-based connectivity are supported by networking gateways that send packets downstream to the mobile stations and receive packets from the mobile stations addressed for upstream network nodes or network nodes on the public Internet. When a gateway performs a procedure to locate an inactive mobile station to request the establishment of a signaling connection, this process is known as paging.

DESCRIPTION OF EXAMPLE EMBODIMENTS

Figure 1:
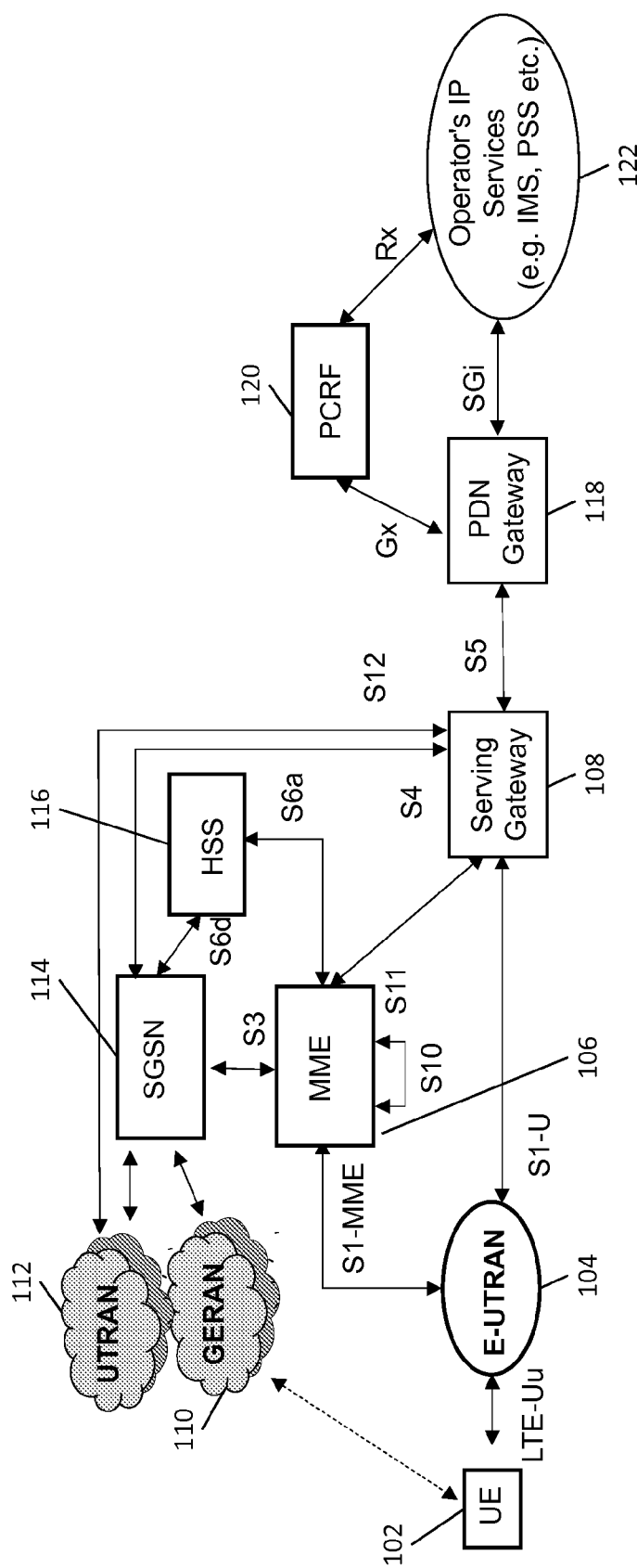
FIG. 1 is a schematic diagram showing a 3GPP network with multiple radio access technologies, in accordance with some embodiments.

Systems and methods are provided for avoiding excessive paging through messaging-based solutions on a mobile network that supports multiple radio access technologies (RATs), such as both Long Term Evolution (LTE) and Global System for Mobile Communications (GSM)/Enhanced Data Rates for GSM Evolution (EDGE)/Universal Mobile Communications System (UMTS) technology.

The present disclosure specifically addresses methods to avoid excessive paging in situations where the present location of a mobile device, referred to here as a user equipment (UE), is not known. Radio resources in the paging channel are scarce and should be preserved wherever possible. Reducing or preventing paging in access networks where the UE is not present can ensure efficient use of radio resources in the paging channel and reduces signaling load on other interfaces.

In one embodiment, a user equipment (UE) is simultaneously connected to a Serving General Packet Radio System (GPRS) Support Node (SGSN) and a Mobility Management Entity (MME). By using signaling between the SGSN and MME, the location of the UE may be tracked such that it is possible to determine the location of the UE without requiring unnecessary paging, even when the UE is in IDLE mode or is inactive.

In one embodiment, a method may be used comprising: a first core network node receiving a request for a mobile device at a first core network node implementing a first radio access technology (RAT); determining whether the mobile device is connected to the first core network node and in an active state at the first core network node; and if the mobile device is not connected to the first core network node, determines whether the mobile device is connected to a second core network node, the first network node making the determination based on stored information at the first core network node about the state of the second core network node, wherein the stored information is based on received information received in access indication messages; and if the mobile device is not connected to the first core network node but is connected to the second core network node and is in an active state at the second core network node, the first core network node subsequently refraining from paging the mobile node for allowing data to be sent to the mobile node via the second core network node, wherein the first core network node and the second core network node are in communication with different RAT access networks.

In another embodiment, a method may be used comprising detecting a failure of a serving gateway (SGW) for a mobile device at a primary core network node for communicating with mobile devices via a first radio access technology (RAT); determining whether the mobile device is connected to the primary core network node and in an active state; if the mobile device is not connected to the primary core network node, causing the mobile device to be connected and brought to an active state; sending an activity notification message to a corresponding core network node capable of communicating using a second radio access technology; and requesting deactivation of bearers associated with the mobile node at the corresponding core network node on the second radio access technology, the activity notification message indicating to the corresponding core network node that the mobile node is active on the primary core network node.

LTE is the latest standard in mobile network technology and significantly improves the user experience over existing GSM/EDGE and UMTS technology. Initial deployments of LTE co-exist with existing GSM/EDGE and UMTS radio access technologies, and user equipment (UE) may roam in idle mode between multiple radio access technologies (RAT), particularly during the initial stages of LTE deployment, where coverage may be incomplete in some areas. Interworking between LTE and UMTS technologies is described in 3GPP Technical Specification (TS) 23.401, and may involve communication between an SGSN and a MME using a Gn or S3 interface. This application also contemplates the use of further interworking between LTE and other radio access technologies, as is known in the art.

A UE using both LTE and UMTS may perform a combined attach procedure to attach to both evolved packet system (EPS) and non-EPS services (e.g., circuit-switched (CS) services), or both EPS services and "short message service (SMS) only" services, in order to maintain access to both sets of domains. The UE may perform a combined tracking area update (TAU) procedure to update the registration of the actual tracking area with both EPS and non-EPS core network nodes (see 3GPP TS 23.401 and 3GPP TS 24.301). During these procedures, the serving MME initiates a location update for non-EPS services procedure towards a visitor location register (VLR) providing the CS or/and SMS services. The location update thereby establishes an association using the SGs interface between the MME and VLR (see 3GPP TS 23.272 and 3GPP TS 29.118).

When the VLR receives a subsequent circuit-switched terminated service request, such as a circuit-switched call or SMS, the VLR sends an SGs Paging Request message to the serving MME with a "CS call indicator" or an "SMS indicator." This request triggers a CS Fallback procedure or SMS transfer via LTE, as needed (see 3GPP TS 23.272 and 3GPP TS 29.118). These fallback procedures thus enable a UE to seamlessly transition from an LTE network to a legacy circuit-switched network for certain services.

When a change of radio access technology occurs, such as from GSM Edge Radio Access Network (GERAN)/Universal Terrestrial Radio Access Network (UTRAN) to evolved UTRAN (E-UTRAN) or from E-UTRAN to GERAN/UTRAN, a subscriber commonly initiates Tracking Area Update (TAU) procedures for LTE or Routing Area Update (RAU) procedures for UMTS. A tracking area update (TAU) message causes a tracking area list to be updated at the MME with the location of the UE, and also causes the MME to update a home subscriber server (HSS) with the current tracking area (TA) of the UE. A routing area update (RAU) message performs a similar function in UMTS networks. However, the UE is considered to only belong to a single radio access technology (RAT) at any given time, and the UE commonly initiates a tracking area update or routing area update each time the UE moves from one radio access technology to another.

The idle mode signaling reduction (ISR) feature of LTE provides a mechanism to reduce signaling load during inter-RAT cell re-selection in idle mode. When using ISR, a UE in an idle state may move between a E-UTRAN and a GERAN/UTRAN network without initiating Tracking Area Update or Routing Area Update procedures. Instead, a single UE can be registered in an E-UTRAN tracking area (TA) and simultaneously registered in a GERAN/UTRAN routing area (RA), and two periodic timers for both registrations will run independently. This reduces or eliminates the need for a UE to initiate update procedures when moving between the E-UTRAN and GERAN/UTRAN networks. However, while the ISR procedure allows efficient usage of battery power at the UE, this power efficiency comes at the cost of a complex and redundant paging procedure in multiple core network nodes under certain circumstances. This is because the UE is registered at two RANs simultaneously.

Idle mode signaling reduction can be used in several UE states, including evolved packet system (EPS) connection management (ECM)-Idle (ECM-IDLE), packet mobility management (PMM)-Idle (PMM-IDLE), and GPRS-STANDBY states. The SGSN will be an S4 SGSN when ISR is used. ISR is activated at a UE, MME, SGSN and SGW as shown in the call flow mentioned in FIG. J.3-1 in Annex J of TS 23.401.

ISR activation happens when a UE has become attached at one radio access technology (RAT) and subsequently performs a Routing Area Update or Tracking Area Update to connect to another RAT. As an example, for a subscriber that is initially attached at a SGSN, and then does a Tracking Area Update into a MME, the MME fetches context from the SGSN and also informs the SGSN that it is ISR-capable. After transferring the subscriber contexts to the MME, the SGSN will keep the subscriber contexts and may choose not to release them, so that subscriber is now simultaneously registered at both SGSN and MME. Once negotiation is complete, the MME can send a TAU accept message to the UE with the ISR activation flag set.

Alternatively, if a subscriber is initially attached at a MME and does a Routing Area Update into an SGSN, the SGSN fetches context from the MME and also informs the MME that it is ISR capable. After transferring subscriber contexts to the SGSN, the MME will keep the subscriber contexts and may choose not to release them, so that subscriber is now simultaneously registered at both SGSN and MME. The SGSN then sends a RAU accept message to the UE with the ISR activation flag set.

Alternatively, if a subscriber is initially attached at a SGSN and is in the CONNECTED state, the subscriber may request a connected mode Inter RAT handover to a MME. The SGSN sends the subscriber's context to the MME, and also indicates that it is ISR-capable. After transferring the subscriber contexts to the MME, the SGSN will keep the subscriber contexts and may choose not to release them, so that the subscriber is now simultaneously registered at both SGSN and MME. The subscriber will subsequently do a Tracking Area Update to MME over an already-established signaling connection. In the TAU accept message, the MME will indicate to the UE that ISR is active.

Similarly, when the subscriber is initially attached at a MME and is in CONNECTED state, and requests a connected mode Inter RAT handover to a SGSN, ISR is activated in a similar fashion, except that the roles of the SGSN and MME are switched, and that the subscriber may use a Routing Area Update instead of a Tracking Area Update. The reader is encouraged to refer to section J.3 and figure J.3.1 of TS 23.401, which is incorporated herein by reference, for further examples of ISR activation.

When ISR is activated for a given UE, both the MME and SGSN must each be aware of the corresponding node. Thus, although an attach request/attach accept does not by itself result in a MME-SGSN association, such an association is created after ISR activation. Activation of ISR may be said to result in an association of a UE, MME, SGSN and a SGW as described above. One corollary of this association is that failure of one of the nodes in the association, such as an SGW, will require ISR to be deactivated at all UEs connected to the failed SGW.

After ISR is activated for a UE, the SGW maintains one control tunnel towards the associated MME and one control tunnel towards the SGSN for the UE. At any given time, the SGW will have data tunnels active with either an eNodeB, a SGSN/RNC, or neither, depending on whether the UE has an active radio connection through E-UTRAN or UTRAN. If the UE is IDLE, then the SGW will not have an active data tunnel to the e-NodeB or the SGSN. Consequently, if the SGW receives downlink data, it will request both SGSN and the MME to page the UE in order to find the UE and set up a data tunnel, via a Downlink Data Notification (DDN). The UE will set up a radio connection through the RAT at which it is currently present.

Alternatively, when the UE moves or becomes inaccessible via one or both RANs, and a paging process is initiated to locate the RAN, a ISR activated UE will be paged in both its registered RA and all registered TAs. The UE will respond to the paging request only in the access network where it is currently present. Paging over the other access network's paging channel is unnecessary, and may also be difficult to stop even when a response is received from the UE via the other paging channel. This leads to inefficient use of the paging channel in the disconnected access network.

Further, in other cases, the SGSN/MME may not be aware of the UE's registration at the other core network node. This leads to inefficient paging of the ISR-activated UE in one access network that occupies the paging channel that results in no response, and failure to page the UE in the access network where it is still connected.

As well, once the UE establishes connectivity through one radio access network, it would be beneficial if the SGW could ask the core network node on the other radio access network to stop paging. However, such a mechanism is defined only between the SGW and MME/SGSN.

There are several other scenarios in the network where there is no way to reduce or stop needless paging. The current 3GPP specifications do not avoid excessive or wasteful paging in access networks where a UE is not present in several scenarios. The following paragraphs list various scenarios where parallel paging in both E-UTRAN and UTRAN/GERAN occurs, and describe embodiments of systems and methods to handle these situations.

At least six scenarios may be contemplated. In a first scenario with an active data connection, a UE has an active radio connection through one of the RANs, and a SGW has active data tunnel towards either the eNodeB or SGSN. When downlink data is received at the SGW, this scenario results in the SGW directly forwarding the packet to the node to which it has an active data tunnel, without excessive paging.

In a second scenario with a control connection only, a UE is in an IDLE state. The SGW has only a control connection to both the SGSN and MME. When downlink data is received at the SGW, the SGW sends a Downlink Data Notification message to both the SGSN and MME. Both the MME and SGSN will page the UE via the E-UTRAN and UTRAN/GERAN in parallel. The UE will receive the page and send a service request to the RAN to which it is currently connected. Either the MME or the SGSN will receive the service request, will send a Modify Bearer Request to SGW, and will establish the data path. However, excessive paging can be avoided because the SGW is capable of asking the other core network node to stop paging.

In a third scenario, involving an S4 Path Failure, a UE is in the ECM-CONNECTED state. In this state, the UE has an active S1-AP connection to the MME but no Iu connection to the SGSN. Now the SGSN discovers an S4 interface path failure. At this point the SGSN will deactivate the PDP contexts for the UE and will have to trigger paging towards UE, in order to subsequently send a Deactivate PDP Context Request. However, the UE already has a control connection towards the MME. If the MME has also detected an SGW Path failure, it will send a deactivation request to the UE as well, hence making paging by the SGSN unnecessary. Currently, certain SGSNs handle this case by not doing any paging towards the UE and doing a local PDP deactivation at SGSN when ISR is active. However, SGSN behavior in this scenario is not explicitly described by any specifications. In some embodiments, needless paging by the SGSN can be avoided by making the SGSN aware that the UE has a control connection at the MME. An S4 path failure triggers PDP deactivation for all UEs that have active PDP connections with that SGW. If many such UEs are in an IDLE state, then paging will be initiated for those UEs which will cause excessive load on the RAN. If the SGSN can avoid needless paging for UEs that are already camped on an E-UTRAN, RAN congestion will be avoided.

In a fourth scenario, the gateway mobile location center (GMLC) case, a UE is in the IDLE state. When the associated GMLC wants to obtain the UE's location, it queries a home subscriber server (HSS) for information about the current SGSN/MME to which the UE is registered. If ISR is active, the HSS sends both SGSN and MME registrations to the GMLC. The GMLC then sends "Provide Subscriber Location" messages to both the SGSN and MME. Both SGSN and MME will then page the UE. The UE will receive one of the two paging messages, and will then set up a signaling connection with one of the nodes, which may be the node to which the UE was last associated before it went IDLE.

However, even when a signaling connection has been established, there is no way to stop paging at the corresponding node. Instead, paging will proceed until it times out on the corresponding node. This may be a concern if, for example, location reporting is deployed along with the ISR feature in networks, as location tracking applications, geo-fencing applications, or applications that allow tracking of other user's locations may periodically perform paging to allow tracking of a UE's location. If ISR is active and if the UE is IDLE, then paging will be done both on E-UTRAN and UTRAN.

In accordance with some embodiments, paging on the corresponding node may not be needed, and may be stopped if the node on which signaling connection is established informs the corresponding node through the S3 tunnel that paging is no longer required. For example, if a first SGSN/MME is performing paging with a UE, and the SGSN or MME is aware that the UE already has a signaling connection at a peer MME/SGSN, the first node need not page UE at all, as the peer node will track the UE location and will respond to GMLC.

In a fifth scenario, a UE is in Connected mode with either a SGSN or MME. ISR is activated for the UE. An associated HSS sends a Cancel-location message to withdraw a subscription, to both the SGSN and MME. The core network node where the UE is connected will send a Detach Request to the UE. However, the core network node that is not connected to the UE will send a paging request in search of the UE. Paging on the non-connected node core network node can be avoided if the UE's status in one node is available to the corresponding node. However, paging can be minimized if UE is in the IDLE mode. This case may not be a frequent case and even if this occurs, excessive paging for a single UE may not cause a big issue in the RAN. However, it may be ameliorated by some embodiments.

In a sixth scenario, the UE is in an IDLE state at SGSN and an ECM-CONNECTED state at MME. When a PGW initiated bearer deactivation request is received, the SGW may forward the Delete Bearer Request to both the SGSN and MME. The MME may send the bearer deactivation request to the UE. However, the SGSN is not connected to the UE and may thus page the UE. Paging by the SGSN in this case is not necessary.

Scenarios 3 and 4 cause excessive paging in the RAN and may cause congestion of RAN. The following section proposes solutions, in particular, that make the non-connected core network node (SGSN/MME) aware of the UE's status at the corresponding node (MME/SGSN). The present disclosure refers below to the "local node" to refer to the core network node that is performing processing or sending a message, and the "remote node" or "communicating node" to refer to the core network node that is in communication with the local node, where the local node is either an SGSN or MME (or other core network node), and the remote node is either an MME or SGSN in communication with the local node (or other core network node), respectively. Both nodes may be referred to as peer nodes.

Certain embodiments of the present disclosure provide systems and methods for tracking where the UE has an active signaling connection when ISR is active; for avoiding needless paging at the access network where the UE is not active; for performing staggered paging when the UE is idle at both the E-UTRAN and UTRAN/GERAN access networks; for avoiding congestion of the RAN due to excessive paging during path failures when ISR is active; and for avoiding congestion of the RAN due to excessive paging during location reporting when ISR is active.

Certain embodiments of the present disclosure provide one or more of the following advantages over existing methods:

1. A reduction in paging channel usage may be achieved, as unnecessary paging in the access network where the UE is not present can be avoided when the UE is already connected to another access network.

2. A reduction in signaling on other interfaces associated with the SGSN/MME's for ISR-activated UEs may be achieved.

3. This reduction in signaling is achieved with a small number of additional messages. Most of the proposed message exchanges merely piggyback additional information over existing standard messages. Hence, the proposed solution achieves network resource optimization with minimal additional signaling.

FIG. 1 is a schematic diagram showing a 3GPP network with multiple radio access technologies, in accordance with some embodiments. User equipment (UE) 102 is connected via an LTE-Uu interface with evolved universal mobile telecommunications system (UMTS) terrestrial radio access network (E-UTRAN) 104. EUTRAN 104 is connected to mobility management entity (MME) 106 via an S1 interface, and to serving gateway (SGW) 108, also via an S1 interface. Together, EUTRAN 104, MME 106, and SGW 108 provide some of the essential services needed for an LTE network.

UE 102 is also potentially connected to global system for mobile communications (GSM) enhanced data rates for GSM evolution (EDGE) radio access network (GERAN) 110 and UMTS terrestrial radio access network (UTRAN) 112, which provide GSM, EDGE, and UMTS services. GERAN 110 and UTRAN 112 are connected to core network nodes that provide GSM, EDGE and UMTS services, such as serving global packet radio service (GPRS) support node (SGSN) 114. GERAN 110 and UTRAN 112 also share serving gateway 108 with the LTE E-EUTRAN 104, in addition to corresponding nodes that provide UMTS services.

Home subscriber server (HSS) 116, SGW 108, packet data network (PDN) gateway 118, and policy, charging and rules function (PCRF) 120 are shared by each of the UMTS, GSM, EDGE, and LTE networks to provide services that include connectivity to operator packet networks through PDN gateway 118 and administrative/accounting services via PCRF 120. An operator may provide various Internet protocol (IP)-based services via its own network (shown at 122).

A UE may use more than one radio access technology (RAT) at a time, or may switch between multiple RATs, in order to receive uninterrupted service. In FIG. 1, this is represented by a solid line between UE 102 and EUTRAN 104, showing an active connection, and a dotted line between UE 102 and GERAN 110, showing an idle or inactive connection. Other combinations may be contemplated, and are discussed below, including: connectivity with one or the other network; connectivity with all networks; and connectivity with no networks (i.e. IDLE).

Figure 2:
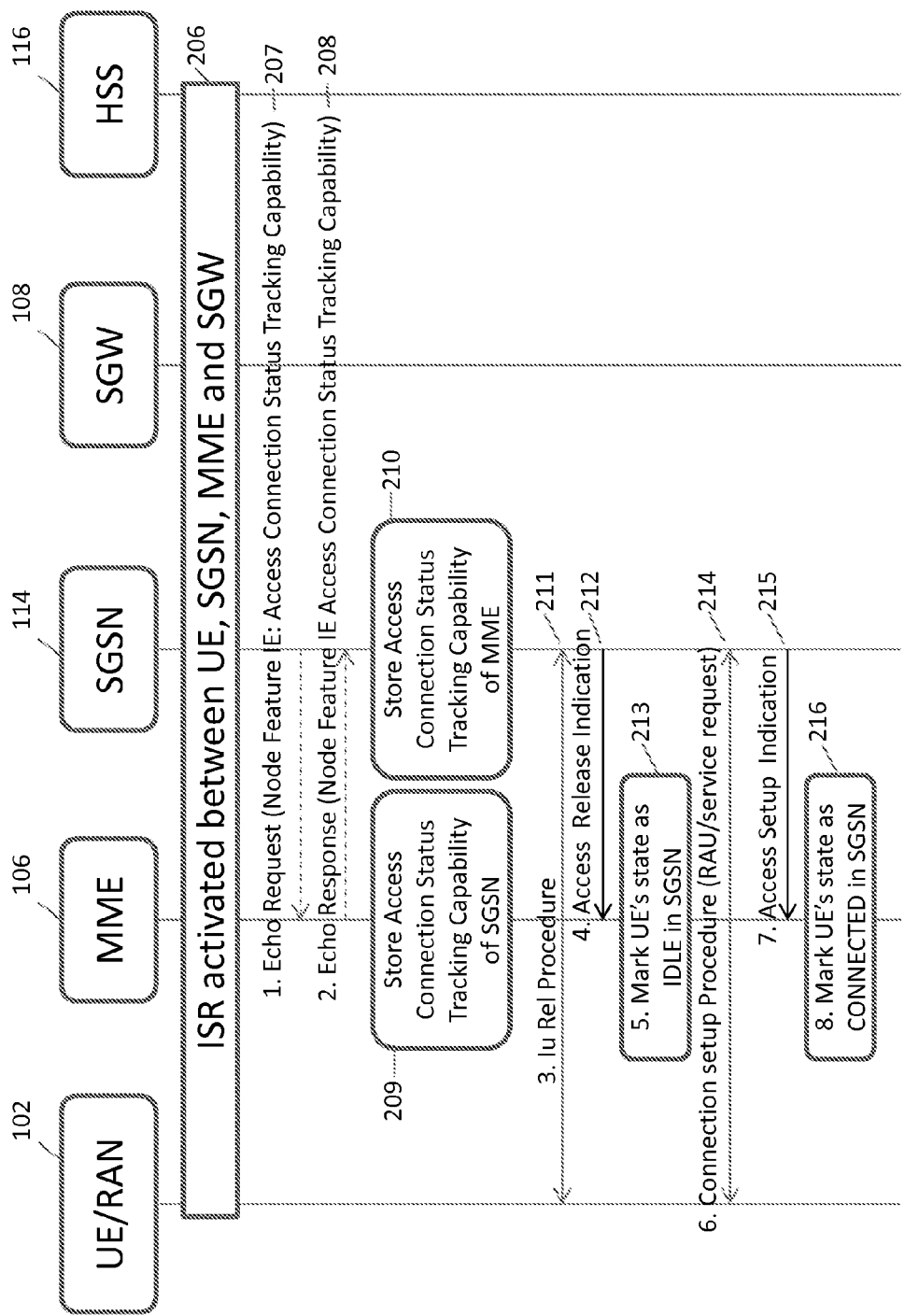
FIG. 2 is a call flow diagram reflecting enhancements, during release of signaling connection towards a user equipment (UE) and re-establishment of signaling connection with the UE, to support reduced paging when idle signaling reduction (ISR) is active, in accordance with some embodiments.

FIG. 2 is a call flow diagram reflecting enhancements to support reduced paging during release of a signaling connection towards a user equipment (UE) and re-establishment of the signaling connection with the UE when ISR is active, in accordance with some embodiments. In the displayed call flow diagram, UE 102 has previously been connected to MME 106, has released the connection with the MME and thereby become IDLE, and is in the process of connecting to SGSN 114. UE 102 has ISR activated at core network nodes MME 106, SGSN 114, and SGW 108, as shown at step 206, and HSS 116 has been updated with information about the ISR state of the UE 102 and the location of the UE 102.

At step 207, SGSN 114 sends an echo message to MME 106. The echo message may be an S3 echo message. In some embodiments, the echo message may be altered by adding a field that contains an additional information element (IE), Node Feature Access Connection Status Tracking Capability. The additional IE may degrade gracefully (by requiring no action to be taken) if the receiving core network node does not support it. However, if the receiving node does support it, it may be interpreted as a request for the receiving node to respond regarding whether the receiving node has access connection status tracking capability, i.e., as a nodal capability request. In step 208, MME 106 responds accordingly to the message by sending an echo message containing a response to SGSN 114. Generally, both access setup indication messages and access release indication messages may be transmitted using echo messages, S3 messages, or other types of messages. Access setup indication messages and access release indication messages are types of access indication messages, i.e., they indicate whether a UE is camped on a particular radio access network.

Once the MME responds, both the MME and the SGSN are aware that both nodes support access connection status tracking, as they have a priori information about tracking at the self node (i.e., MME 106 has information about whether MME 106 can perform tracking), and as they have received information about tracking capability at the corresponding node. This information is stored at the SGSN 114 and MME 106, respectively, at steps 209 and 210. One exemplary method of storing may be a correspondence table or lookup table, relating the tracking capability of a given node with an identifier for the given node, i.e., "MME 106->Supports Tracking" Different methods of storing may be contemplated. This information can be retrieved and used in processing steps as described below. Steps 209 and 210 also reflect the SGSN 114 and MME 106 storing the current state of the UE 102, i.e., that the UE 102 is currently connected via an active connection to SGSN 114.

At step 211, UE 102 initiates an Iu-protocol release procedure at the SGSN 114, which results in the UE being released. (The bi-directional arrow between UE 102 and SGSN 114 reflects both the release request and the release response.) Once the release is complete, SGSN 114 sends an access release indication 212 to MME 106. At step 213, MME 106 updates its tracking information data with the fact that SGSN 114 is no longer connected to UE 102, but that the UE is now in the IDLE state.

At step 214, a connection is set up between UE 102 and SGSN 114. The connection may be set up via a routing area update (RAU) initiated by the UE, or via a service request initiated by the core network via the SGSN. A service request is a request for a radio connection; in some cases this can be a request by a UE for radio resources for a session that is already present on the SGSN (or MME), as when a UE has previously connected to the SGSN and has entered an IDLE state. Once the radio connection is set up, the UE exits the IDLE state and enters the PMM-CONNECTED state. At step 215, SGSN 114 sends an Access Setup Indication to MME 106, indicating that UE 102 is now connected to SGSN 114. MME 106 then saves the state of the UE for subsequent use, as shown at step 216.

The following additional information may be exchanged between the MME and SGSN during ISR activation to achieve paging reduction if the UE is available on at least one radio access network.

1. The SGSN may be informed of the Access Connection Status Tracking Capability of the MME.
2. The MME may be informed of the Access Connection Status Tracking Capability of the SGSN.

In some embodiments of the present disclosure, paging avoidance can be supported when ISR is active if both the SGSN and MME support the capability to track the status of the access-side connection of a given UE on the corresponding node. Support for access connection status tracking capability at the SGSN or MME can be determined by the exchange of certain parameters as described herein.

The SGSN and MME may exchange Access Connection Status Tracking Capability information with each other using existing GPRS Tunneling Protocol Version 2 (GTPv2) echo messages sent as part of normal communication on the 3GPP control plane, as part of the Node Feature information element (IE).

No change is required in call flows for ISR activation. The local core network node may be made aware of the UE's status in the communicating node via a pair of newly proposed "Access Release Indication" and "Access Setup Indication" messages over the S3 interface.

Echo messages may be exchanged between the SGSN and MME over an S3 interface after the first ISR activation by an UE between the SGSN and the MME. When the UE performs an ISR activation, the local node may then inform the remote or corresponding node of its own Access Connection Status Tracking Capability using Node Feature information elements (IE) in node-level GTP echo messages. The echo procedure between the SGSN and MME may occur at least once if one S3 tunnel is established between the SGSN and MME. At least one UE should be ISR active for the echo procedure to occur between SGSN and MME. In some embodiments, echo messages may be exchanged between SGSN and MME after the first ISR activation. This also reduces signaling in the case that the UE performing ISR activation is first to establish a control tunnel between the SGSN and MME.

The local node may inform the remote or corresponding node of the UE's changes of state, in some embodiments. The UE may change state between ECM-Idle/PMM-Idle/Standby to ECM-Connected/PMM-Connected/Ready or vice versa, via Access Setup Indication/Access Release Indication messages. An SGSN/MME may include the current timestamp in the Access Setup Indication/Access Release Indication message when the UE sets up a signaling connection or releases its signaling connection. The timestamp provides a measure of how recently the UE had a signaling connection at the node sending the access indication message.

Once the local node learns about the UE's state in the remote node, it will be able to decide whether to page UE or avoid paging in subsequent situations, according to some embodiments. For example, if a MME learns that a UE is in the connected state at a SGSN, and if the MME receives a Provide Subscriber Location message, it need not page the UE. A MME/SGSN may perform paging of the UE if the UE's state in the peer node is also IDLE. Also, by knowing the last timestamp at which the UE had a signaling connection at the peer node, a SGSN/MME will be able to decide who should page first in the event of UE being IDLE in both SGSN and MME. Based on the timestamp information, a SGSN/MME may perform, or may determine to perform, staggered paging such that the UE is first paged in the most recent access network or access technology the UE was located at or camped on. Once an attempt to page the UE at the most recent RAT fails, the UE can be paged in the other access network.

Example Use Cases

The following example use cases illustrate various uses of the described embodiments. The present system of knowing the UE's status in the peer node when ISR is active can be used for any scenario where a decision needs to be taken regarding paging the UE.

Mobile-Terminated Location Request for ISR Activated UEs:

If ISR is active for LTE access, the visited gateway mobile location center (V-GMLC) receives both an SGSN and MME address from the home subscriber server (HSS). The V-GMLC may then initiate both PS-MT-LR and EPC-MT-LR procedures. This may lead to separate paging of the UE in each of its registered TA(s) in association with the MME procedure and in its registered RA(s) in association with the SGSN procedure. The UE may then respond to only one paging request, leading to continuation of only one of the MT-LR procedures and a termination of the other. The V-GMLC will discover which is which from the responses it receives from the MME and SGSN for each MT-LR procedure.

When the UE responds to only one paging request, the paging procedure in the other access network is terminated. The termination of the paging procedure may occur on exhaustion of all paging retries, up to a given user- or administratively-scheduled ball, in that particular access network.

Figure 3:
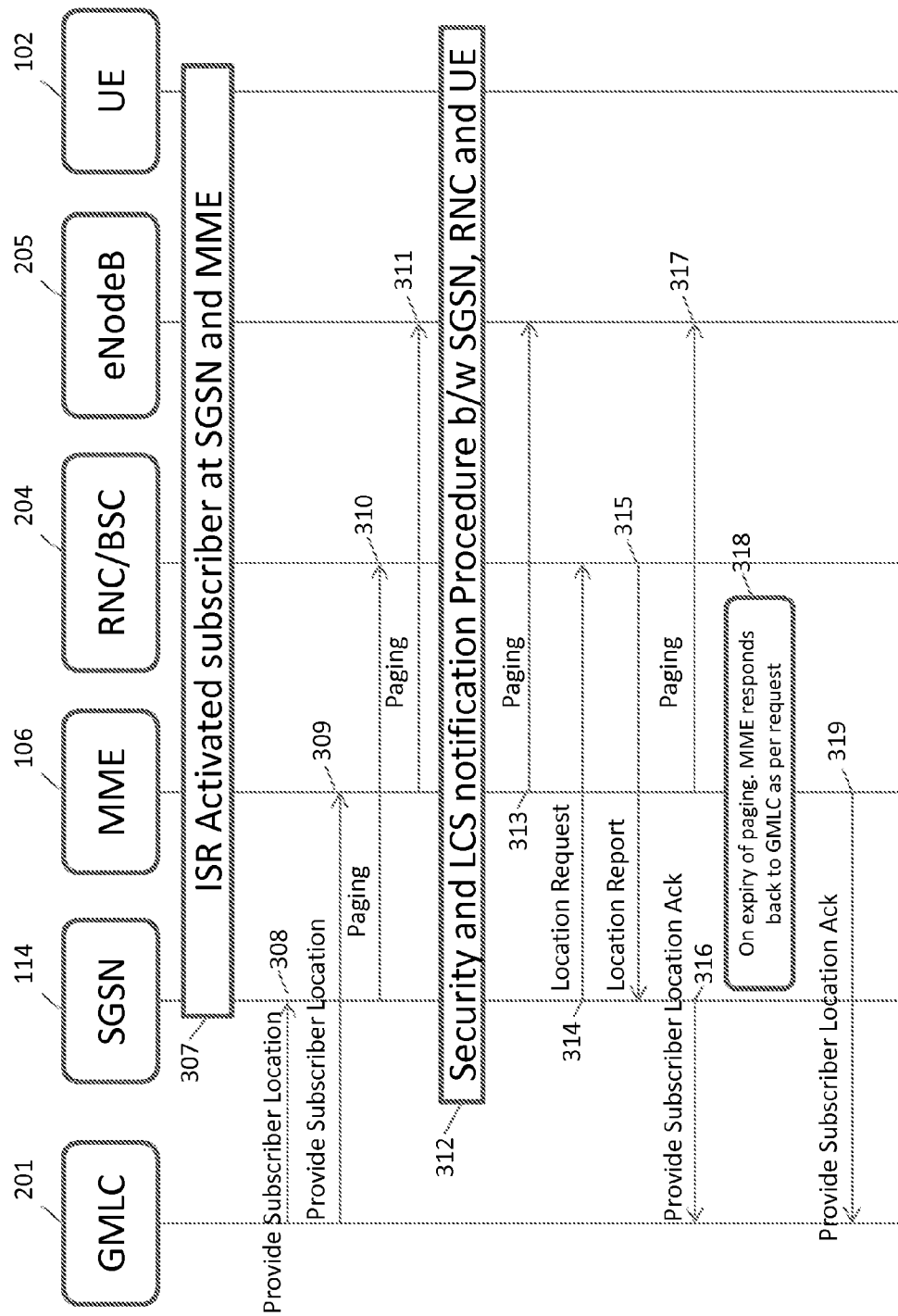
FIG. 3 is a call flow diagram reflecting Mobile Terminated Location Reporting when ISR is active, in accordance with some embodiments.

FIG. 3 is a call flow diagram reflecting a call flow with usage of radio resources, in accordance with some embodiments. UE 102 is connected to a LTE network via eNodeB 305 and MME 106, and is connected to an UMTS network via radio network controller (RNC)/base station controller (BSC) 304 and SGSN 114. UE 102 is also in communication with GMLC 301, which may provide location services (LCS) for both the LTE and UMTS networks. Location services permit identification and reporting of the location of a user or UE by the user, management entity, network, a service provider, or other party. An exemplary specification of LCS features is provided in 3GPP TS 22.071 version 9.1.0.

At step 307, idle state signaling reduction (ISR) is activated for the subscriber and for UE 102, at SGSN 114 and MME 106. As described elsewhere in this disclosure, ISR aims at reducing the frequency of tracking area update (TAU)/routing area update (RAU) messages. ISR can be activated in a TAU Accept/RAU Accept message.

At step 308, GMLC 301 provides subscriber location to SGSN 114. At step 309, GMLC 301 provides subscriber location to MME 106. Subsequently, at step 310, SGSN pages the UE via RNC/BSC 304, and at step 311, MME 106 pages UE 102 via eNodeB 305.

At step 312, a location reporting procedure is initiated between SGSN 114, RNC/BSC 204, and UE 102, as described below in steps 313-319. Location reporting is requested by a node on the core network (not shown) or by UE 102, and the location reporting request is received by both MME 106 and SGSN 114. At step 313, MME 106 performs paging to the eNodeB 305 to locate UE 102. At step 314, SGSN 114 sends a location request message to RNC/BSC 304 to locate UE 102. At step 315, RNC/BSC 304 sends a location report message to SGSN 114. In the situation shown here, UE 102 wakes up first in response to SGSN 114, and when it subsequently receives the page from MME 106 at step 313, UE 102 does not respond. Once SGSN 114 has information about the location of UE 102, at step 316, it sends a subscriber location acknowledgement message to GMLC 301. MME 106 has not yet completed its paging procedure at this point.

At step 317, MME 106 continues to perform paging to eNodeB 305. At step 318, MME 106 has timed out and stops paging. Once paging expires, MME 106 determines a location and prepares to send a response to the GMLC 301. At step 319, MME 106 sends its subscriber location acknowledgement message to GMLC 201.

Figure 4:
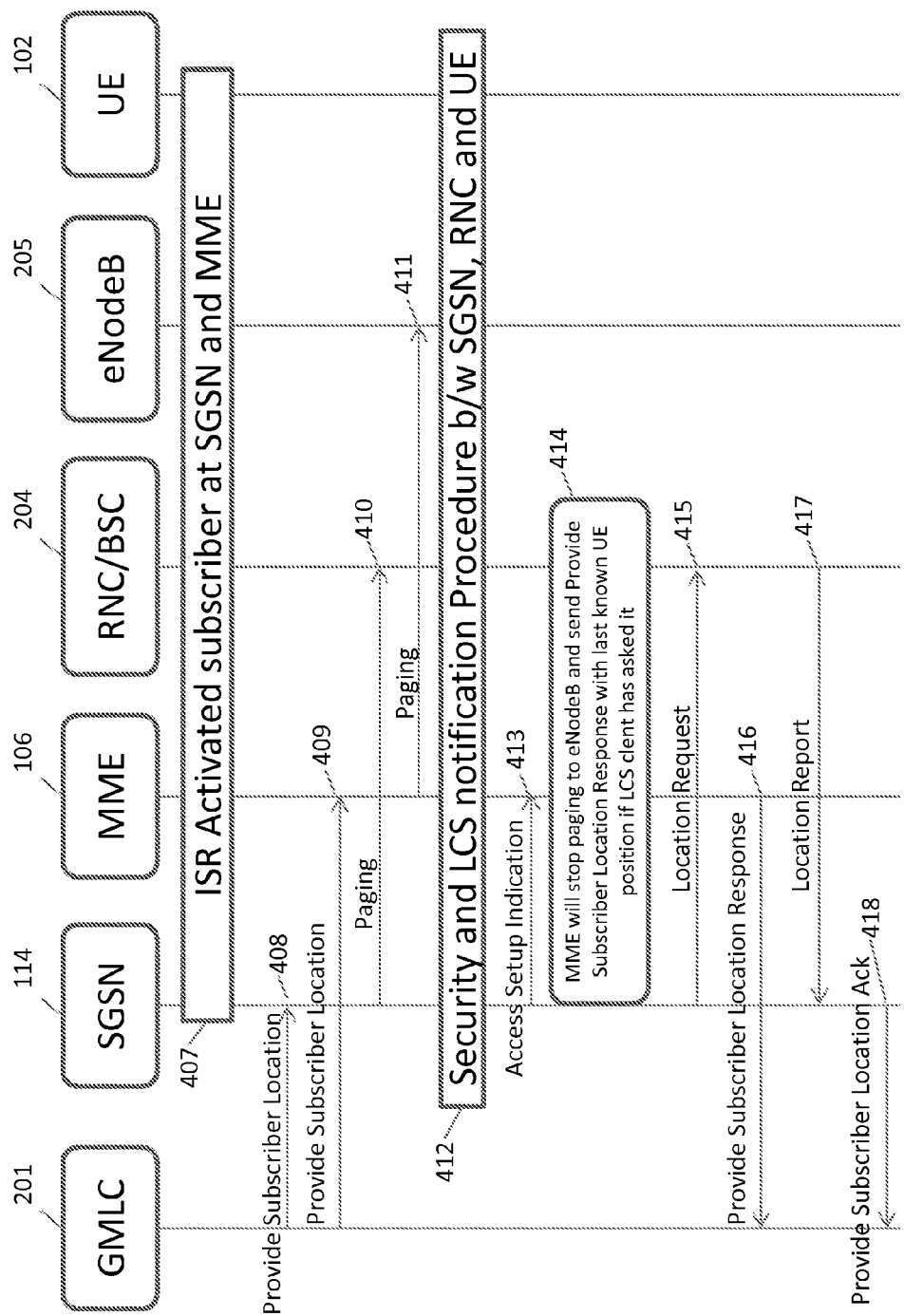
FIG. 4 is a call flow diagram reflecting enhancements to Mobile Terminated Location Reporting to support reduced paging when ISR is active, in accordance with some embodiments.

FIG. 4 is a call flow diagram reflecting Mobile Terminated Location Reporting when ISR is active, in accordance with some embodiments. UE 102 is connected to a LTE network via eNodeB 305 and MME 106, and is connected to an UMTS network via radio network controller (RNC)/base station controller (BSC) 304 and SGSN 114. UE 102 is also in communication with GMLC 301. Steps 407-412 may be equivalent to steps 307-312 in FIG. 3. Note that MME is paging eNodeB 205 beginning at step 411.

At step 413, SGSN 114 sends an access setup indication to MME 106. In some embodiments, whenever an access setup indication is sent, an access setup acknowledgement message may be returned; such an acknowledgement message is not shown in FIG. 3 but may be present. At step 414, MME 106 will stop paging to the eNodeB and will send a Provide Subscriber Location Response with the last known UE position when requested to do so by the LCS client. This is further shown by steps 415-418 below. At step 415, SGSN 114 sends a location request message to RNC/BSC 204. At step 416, the MME 106 sends a subscriber location response to the GMLC 201. At step 417, the RNC/BSC 204 sends a location report to the GMLC 201. At step 418, the SGSN 114 provides a subscriber location acknowledgement 418 to the GMLC 201.

According to the disclosure of FIG. 4, in step 416, MME 106 does not need to wait for the UE 102 to respond to the MME. This is because MME 106 has been informed that UE 102 is currently connected to SGSN 114, which implicitly indicates that UE 102 is in the SGSN's routing area. This allows MME 106 to send an approximate location of the subscriber to the GMLC 201.

In some embodiments, the present system modifies the call flow based on whether the UE responds to paging via the SGSN, or if the UE responds to paging via the MME.

If staggered paging is configured at the SGSN and the MME, then the SGSN/MME may decide which RAT to page based on where the UE was most recently available. Paging for the RAT that was not most recently available is performed next. This results in a staggered paging pattern, where the second network is paged after a delay.

In case of HSS-initiated detach, administrative detach or local policy-based detach for ISR activated UEs, the MME/SGSN may need to perform paging if the UE is in the Idle/Standby state at that node. Paging will fail if UE is connected at the other CN node, such as in the PMM-CONNECTED state as is shown in this figure. This unnecessary paging can be avoided with the proposed method.

In some embodiments, the present system modifies the call flow to enable processing of Cancel-location (Subscription-withdrawn) messages for an ISR-activated subscriber in the ECM-Connected state. The MME will send a detach request to the UE, which will respond back with a detach acceptance. The SGSN can perform paging, and when paging has expired, send an acknowledgement message, or "ack," to HSS.

In some embodiments, the present system modifies the call flow to process Cancel-location (Subscription-withdrawn) for ISR activated subscriber in the PMM-Connected/Ready state. The SGSN will send a detach request to the UE, and the UE will respond back with a detach acceptance. The MME can perform paging, and when paging has expired, the MME can send an ack to the HSS.

Figure 5:
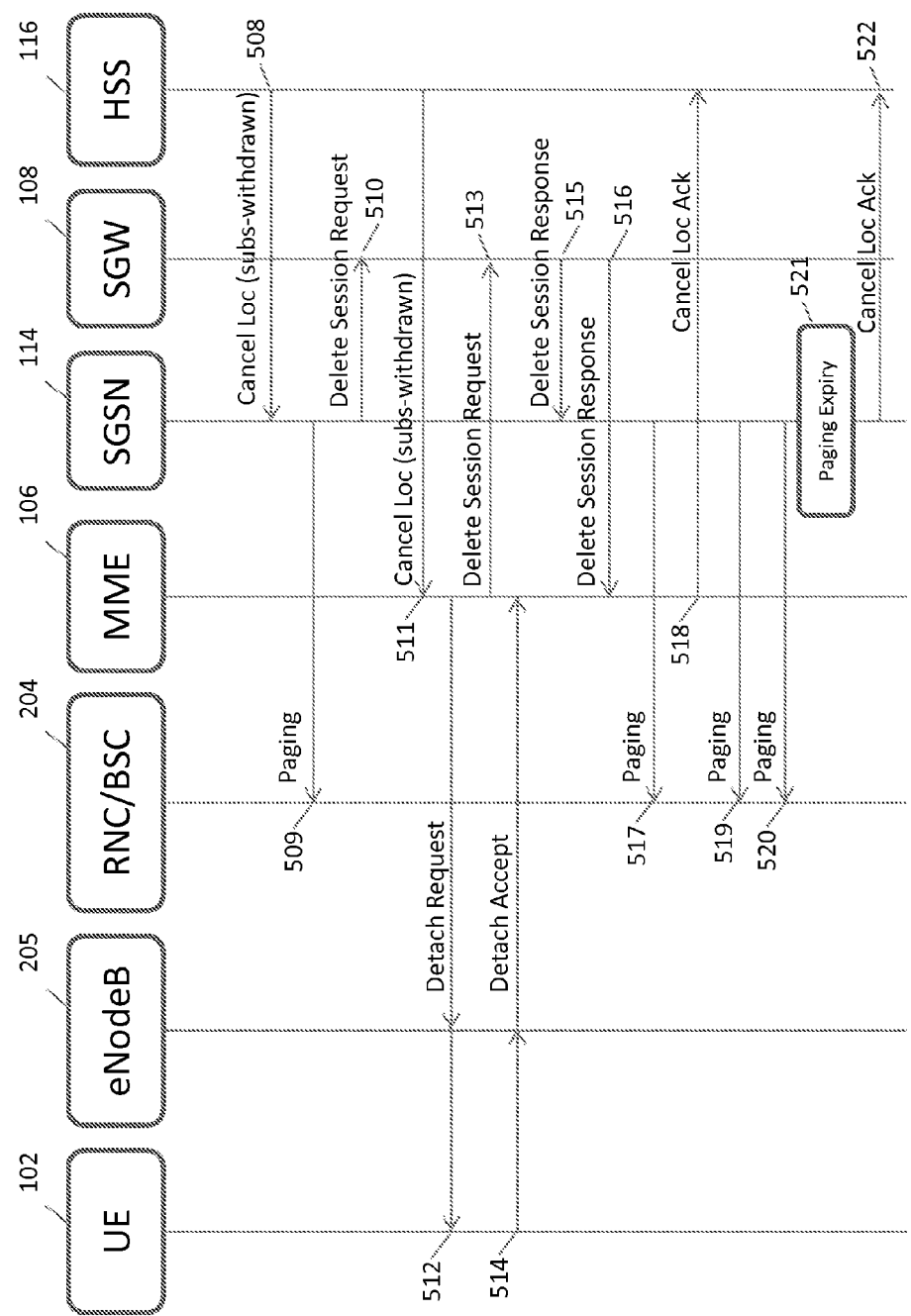
FIG. 5 is a call flow diagram reflecting an HSS-initiated detach when ISR is active and in the Evolved Packet System (EPS) Connection Management (ECM)-CONNECTED state at a mobility management entity (MME), in accordance with some embodiments.

FIG. 5 is a call flow diagram reflecting a call flow with an HSS-initiated detach or admin detach when ISR is active and when the UE is in the ECM-CONNECTED state, in accordance with some embodiments. UE 102 is connected to an LTE network via eNodeB 205 and MME 106, and associated with a tracking area at MME 106. The UE is also connected to a UMTS network via RNC/BSC 204 and SGSN 114, but may be in an IDLE state. UE 102 is also connected to SGW 108 and HSS 116.

At step 508, HSS 116 sends a cancel-location request to SGSN 114. SGSN 114 receives the cancel request, and at step 509 sends a paging request to RNC/BSC 204. At step 510, SGSN 114 may also send a delete session request to SGW 108. Subsequently, at step 511, HSS 116 sends a cancel-location (subscriptions-withdrawn) request to MME 106.

At step 512, the MME sends a detach request to the UE 102. At step 513, MME 106 also sends a delete session request to SGW 108. UE 102 responds at step 514 with a detach acceptance to MME 106. At step 515, SGW 108 sends a delete session response to SGSN 114. At step 516, SGW 108, sends a delete session response also to MME 106. At step 517, SGSN 114 sends a paging request to RNC/BSC 204. At step 518, MME 106 sends a cancel location acknowledgement message to the HSS 116. However, MME 106 does not send any information to SGSN 114.

At steps 519 and 520, the SGSN 114 continues sending paging messages to RNC/BSC 204, to determine the location of the UE, until paging expiry occurs at step 521. At step 522, the SGSN 114 sends a cancel location acknowledgement to HSS 116.

Figure 6:
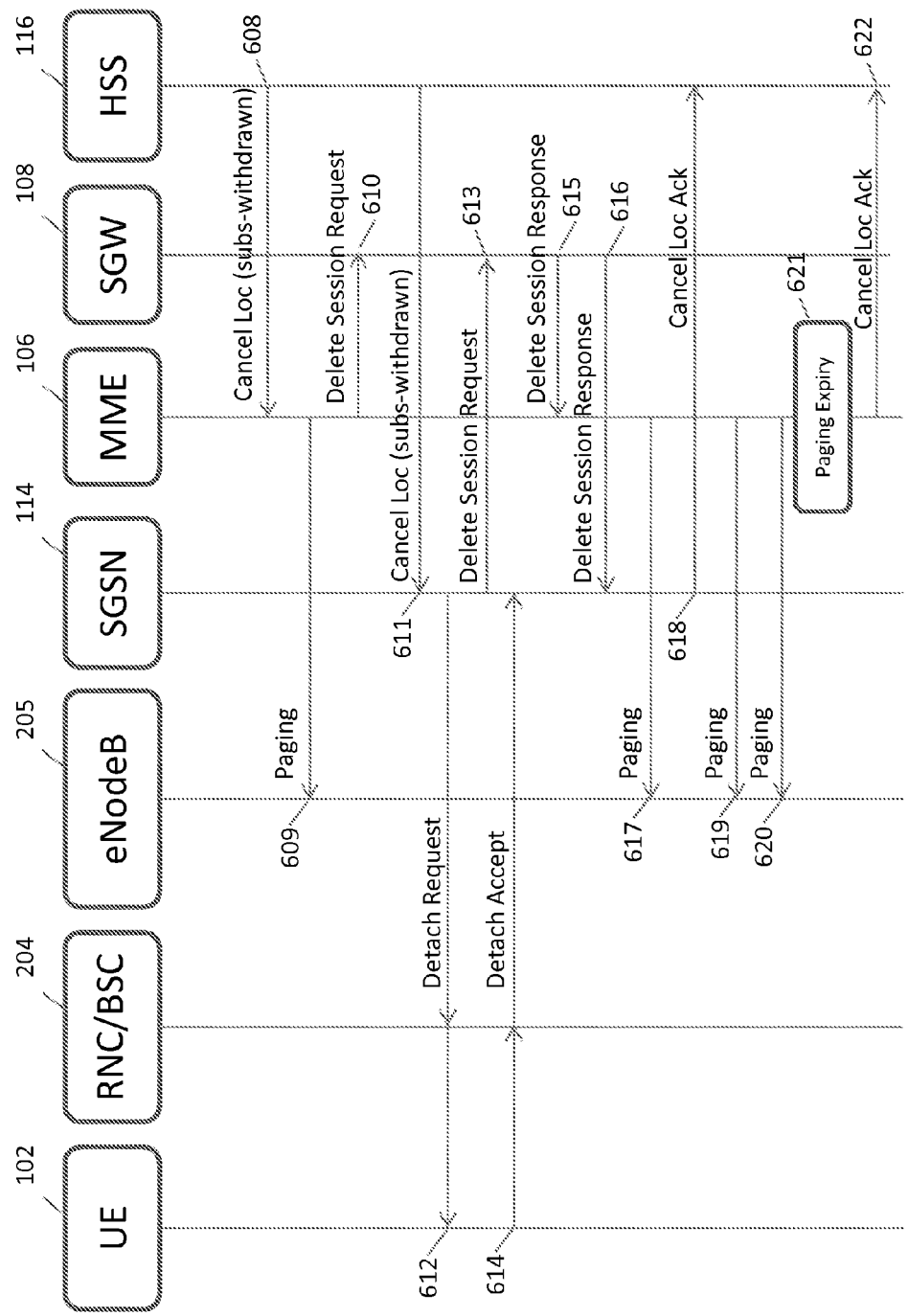
FIG. 6 is a call flow diagram reflecting a call flow with a home subscriber server (HSS)-initiated detach or admin detach when ISR is active and when the UE is in the packet mobility management (PMM)-CONNECTED state, in accordance with some embodiments.

FIG. 6 is a call flow diagram reflecting an HSS-initiated detach when ISR is active and in the PMM-CONNECTED state at the SGSN, in accordance with some embodiments. UE 102 is connected to an LTE network via eNodeB 205 and MME 106, and associated with a tracking area at MME 106, but may be in an IDLE state. The UE is also connected to a UMTS network via RNC/BSC 204 and SGSN 114. UE 102 is also connected to SGW 108 and HSS 116. The diagram shows a HSS-initiated detach for the ISR-activated subscriber performed by the MME. Unlike in FIG. 5, the UE 102 is attached to a routing area at SGSN 114 and not the MME. Since the UE is attached at the SGSN 114, paging of the UE occurs at MME 106 until timeout at step 621.

At step 608, HSS 116 sends a cancel-location request to MME 106. MME 106 receives the cancel request, and at step 609 sends a paging request to eNodeB 205. At step 610, MME 106 may also send a delete session request to SGW 108. Subsequently, at step 611, HSS 116 sends a cancel-location (subscriptions-withdrawn) request to SGSN 114.

At step 612, the SGSN 114 sends a detach request to the UE 102. At step 613, SGSN 114 also sends a delete session request to SGW 108. UE 102 responds at step 614 with a detach acceptance to MME 106. At step 615, SGW 108 sends a delete session response to MME 106. At step 616, SGW 108 sends a delete session response to SGSN 114. At step 617, MME 106 sends a paging request to eNodeB 205. At step 618, SGSN 114 sends a cancel location acknowledgement message to the HSS 116. However, SGSN 114 does not send any information to MME 106.

At steps 619 and 620, the MME 106 continues sending paging messages to eNodeB 205, to determine the location of the UE, until paging expiry occurs at step 621. At step 622, the MME 106 sends a cancel location acknowledgement to HSS 116. In some embodiments, the present system modifies the call-flow to process Cancel-location (Subscription-withdrawn) for ISR activated subscriber with ECM-Connected state with proposed solution. The MME will send detach request and wait for detach accept from subscriber. The SGSN is now aware of UE's status in MME, so the SGSN may choose not to perform paging, and instead sends a cancel-loc-ack to HSS.

Figure 7:
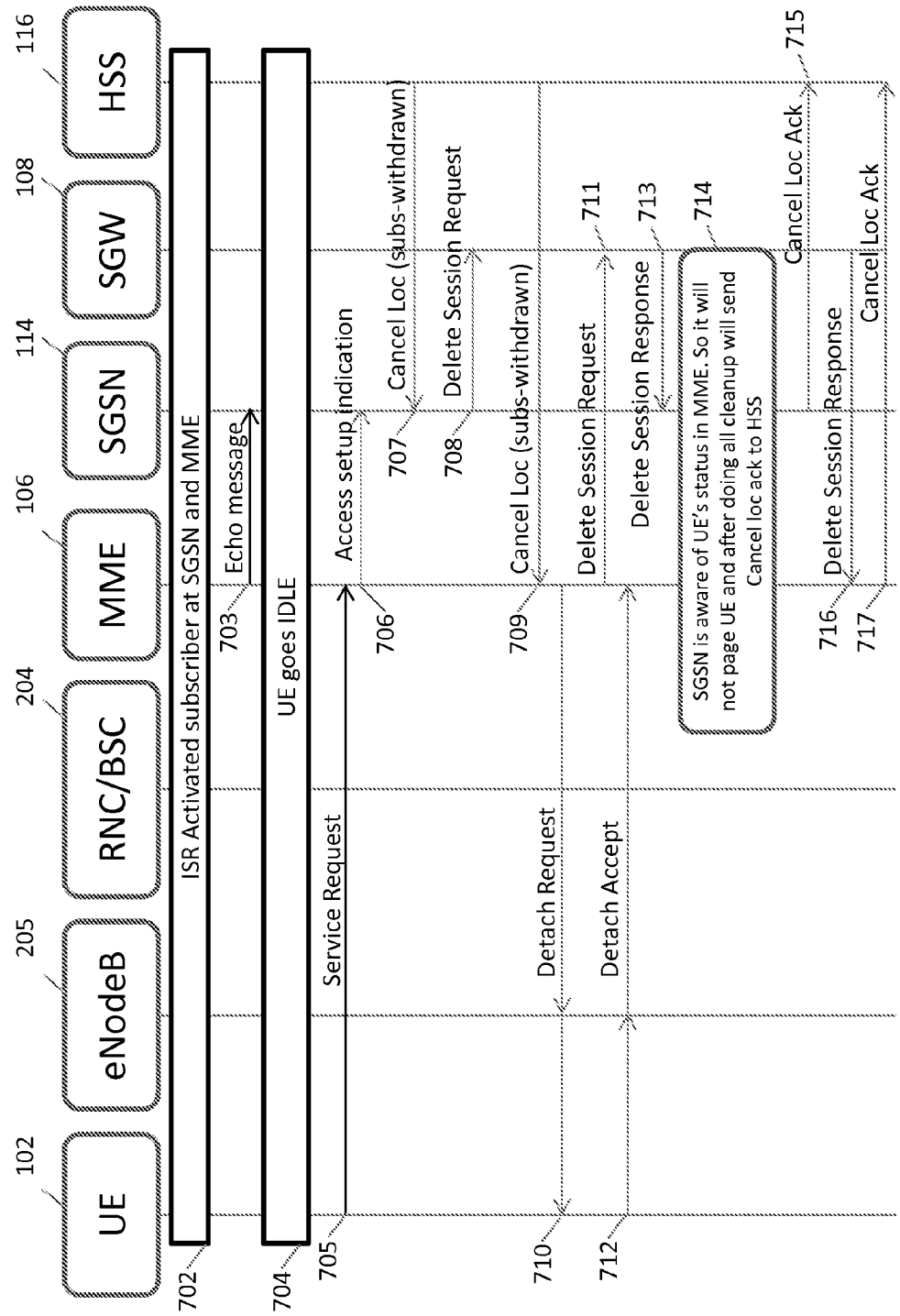
FIG. 7 is a call flow diagram reflecting modifications to the HSS-initiated detach call flow when ISR is active and the UE is in the ECM-CONNECTED state at the MME, in accordance with some embodiments.

FIG. 7 is a call flow diagram reflecting modifications to the HSS-initiated detach call flow when ISR is active and the UE is in the ECM-CONNECTED state at the MME, in accordance with some embodiments. UE 102 is connected to an LTE network via eNodeB 205 and MME 106, and associated with a tracking area at MME 106. The UE is also connected to a UMTS network via RNC/BSC 204 and SGSN 114, but may be in an IDLE state. UE 102 is also connected to SGW 108 and HSS 116.

The figure shows an HSS-initiated detach for ISR active subscriber in IDLE state performed at both the SGSN and MME. When both SGSN and MME receive the Cancel Location from HSS, they both will page the UE simultaneously. When the UE emerges from the IDLE state and attaches to one of the radio access networks, the core network node to which it attaches first will send an Access Setup Indication to its peer and the peer will stop paging. If staggered paging is configured, then either or both of the SGSN and MME may decide to page the UE in the most recent access the UE was camped on.

As described above, the UE is in the ECM-CONNECTED state at MME and is not IDLE. In such a case, when the MME receives a cancel location message from HSS, MME 106 may choose not to page the UE, as the UE has a signaling connection with the MME. Instead, the MME will directly send a detach request to the UE using the signaling connection. SGSN 114 may also know that the UE is connected at the MME through the Access Setup Indication it received from the MME when the UE established a signaling connection with the MME. If neither SGSN 114 and MME 106 are aware of the UE's current location, both core network nodes will page the UE 102. Once the UE responds, the node receiving the response will send a Access Setup Indication to the corresponding node so that paging can be stopped at the corresponding node.

At step 702, UE 102 is connected to MME 106 and SGSN 114 in either the ECM-CONNECTED or PMM-CONNECTED states, and has ISR active. At step 703, MME 106 sends an echo message to SGSN 114 using standard protocols, optionally indicating to SGSN 114 that it is connected to the UE. At step 704, UE 102 goes IDLE. At step 705, UE 102 emerges from the IDLE state and sends a service request message to MME 106, and requests to establish a connection with the MME. At step 706, MME 106 receives the service request, but before responding, it sends an access setup indication to SGSN 114 and indicates that it is now connected to UE 102. At step 707, SGSN 114 receives a cancel-loc message from HSS 116. However, at step 708, as it knows that MME 106 is connected, SGSN 114 sends a delete session request in response instead of sending the cancel-loc message to UE 102.

Subsequently, at step 709, HSS 116 sends a cancel-location (subscriptions-withdrawn) request to MME 106. MME 106 knows it is connected to UE 102, and at step 710, MME 106 sends a detach request to UE 102, and immediately afterward, at step 711, MME 106 may send a delete session request to SGW 108. The detach request is accepted by the UE at step 712. The SGW 108 receives the delete session request. Since SGW 108 is handling communications for UE 102 for both MME 106 and SGSN 114, SGW 108 then sends a delete session response to SGSN 114 at step 713. At step 714, the SGSN 114 is aware of the UE's status at the MME 106 and may choose not to page the UE. Instead, after receiving the delete session response at step 713, it performs cleanup procedures and sends a cancel-loc acknowledgement message, at step 715, to HSS 116. Meanwhile, SGW 108 sends its delete session response to MME 106 at step 716. The MME then completes its cleanup procedures and sends a cancel-loc-ack message to 717.

Figure 8:
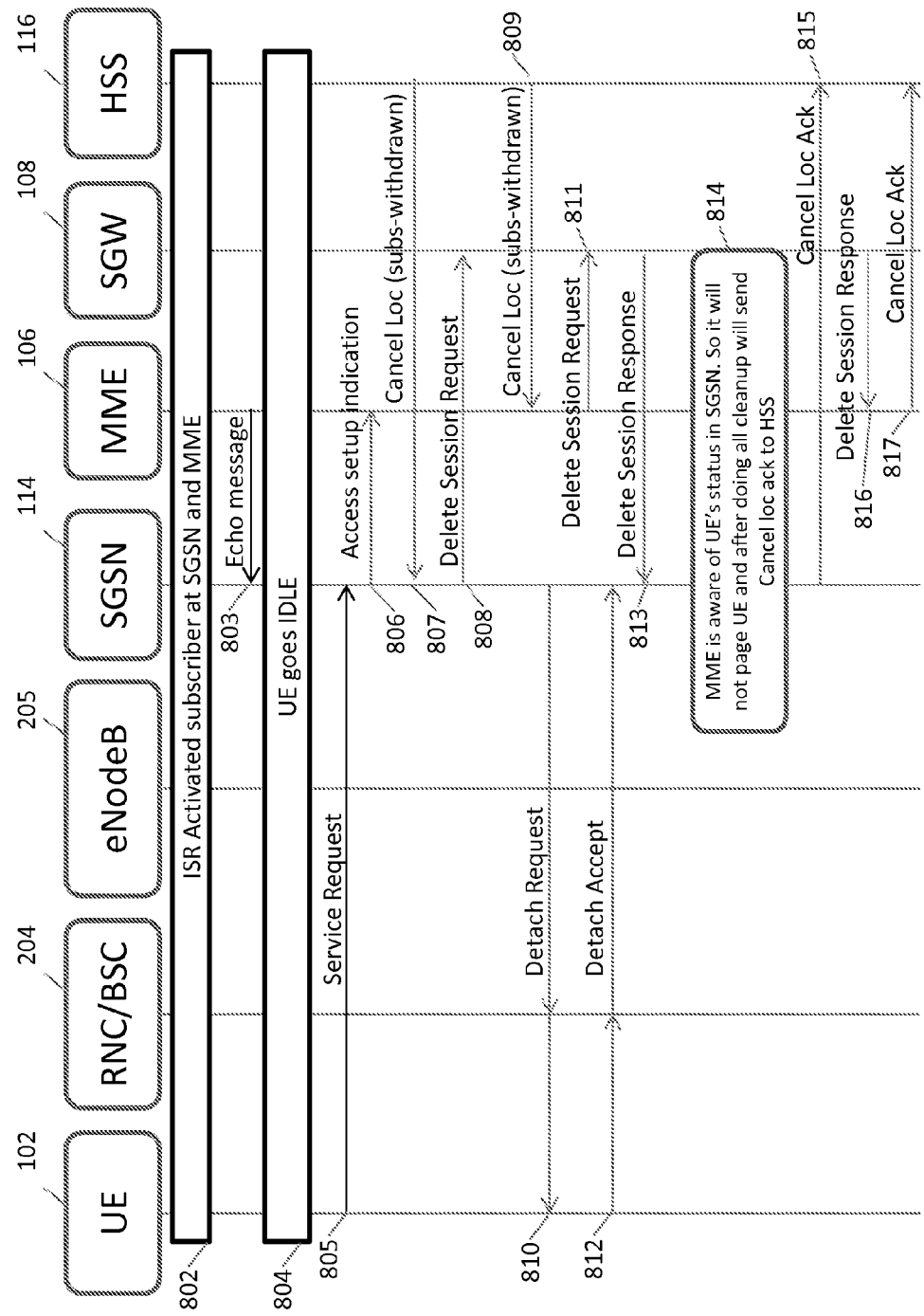
FIG. 8 is a call flow diagram reflecting an HSS-initiated detach call flow when ISR is active and the UE is in the PMM-CONNECTED/Ready state at the serving general packet radio service (GPRS) support node (SGSN), in accordance with some embodiments.

FIG. 8 is a call flow diagram reflecting a HSS-initiated detach call flow when ISR is active and the UE is in the PMM-CONNECTED/Ready state at the SGSN, in accordance with some embodiments. UE 102 is connected to an LTE network via eNodeB 205 and MME 106, and associated with a tracking area at MME 106, but may be in an IDLE state. The UE is also connected to a UMTS network via RNC/BSC 204 and SGSN 114, and is in a PMM-CONNECTED state at the SGSN. UE 102 is also connected to SGW 108 and HSS 116.

The figure shows an HSS-initiated detach for an ISR active subscriber in IDLE state performed at both the SGSN and MME. When both SGSN and MME receive the Cancel Location from HSS, they both will page the UE simultaneously. When the UE emerges from the IDLE state and attaches to one of the radio access networks, the core network node to which it attaches first will send an Access Setup Indication to its peer and the peer will stop paging. If staggered paging is configured, then either or both of the SGSN and MME may decide to page the UE in the most recent access the UE was camped on.

At step 802, UE 102 is connected to SGSN 114 and MME 106 in either the ECM-CONNECTED or PMM-CONNECTED states, and has ISR active. At step 803, MME 106 sends an echo message to SGSN 114 using standard protocols, optionally indicating to SGSN 114 that it is connected to the UE. At step 804, UE 102 goes IDLE. At step 805, UE 102 emerges from the IDLE state and sends a service request message to SGSN 114, and requests to establish a connection with the SGSN. At step 806, SGSN 114 receives the service request, but before responding, it sends an access setup indication to MME 106 and indicates that it is now connected to UE 102. At step 807, SGSN 114 receives a cancel-loc message from HSS 116. At step 808, SGSN 114 responds with a delete session request message to SGW 108.

At step 809, HSS 116 sends a cancel-location (subscriptions-withdrawn) request to MME 106. Meanwhile, SGSN 114 knows it is connected to UE 102, and at step 810, SGSN 114 sends a detach request to UE 102. At step 811, MME 106 sends a delete session request to SGW 108 in response to the cancel-loc request. At step 812, UE sends a detach accept to SGSN 114. At step 813, SGW 108 sends a delete session response to SGSN 114.

Because of access setup indication 806, at step 814, MME 106 is aware of the UE's status in SGSN 114, so it may choose not to page the UE, and instead performs cleanup and sends a cancel loc ack to HSS 116 (at step 817). Meanwhile, SGSN 114 completes its own detach and cleanup and sends its own cancel-loc-ack to HSS 116 at step 815.

When a SGW fails, even if it subsequently becomes available, current versions of the 3GPP standard incur a delay as a result of causing bearers to be torn down, or deallocated, when the SGW failure becomes known, and a further delay when the bearers are recreated or reallocated. In particular, when bearers are being reallocated, a management entity such as an MME or SGSN may initiate paging of a UE in order to reestablish the bearers. However, as described above, paging a UE may incur a significant radio allocation cost, and may also incur a significant delay, particularly when the MME and SGSN both initiate paging. Therefore, it is desirable to improve latency when the MME detects an SGW failure and restart, and it is possible to do so by notifying the MME or SGSN about which RAT the UE is currently connected to.

In case of a SGW/S4/S11 failure for an ISR-activated subscriber, signaling can be optimized if the SGSN/MME is aware of UE's status in the corresponding node. In some embodiments, the present system modifies the call flow for an ISR-activated subscriber in an ECM-connected state on SGW failure. The MME is connected to the UE, and will send a detach request to UE on detection of SGW failure. The SGSN is not connected to the UE and will instead start paging on detection of SGW-failure.

Figure 9:
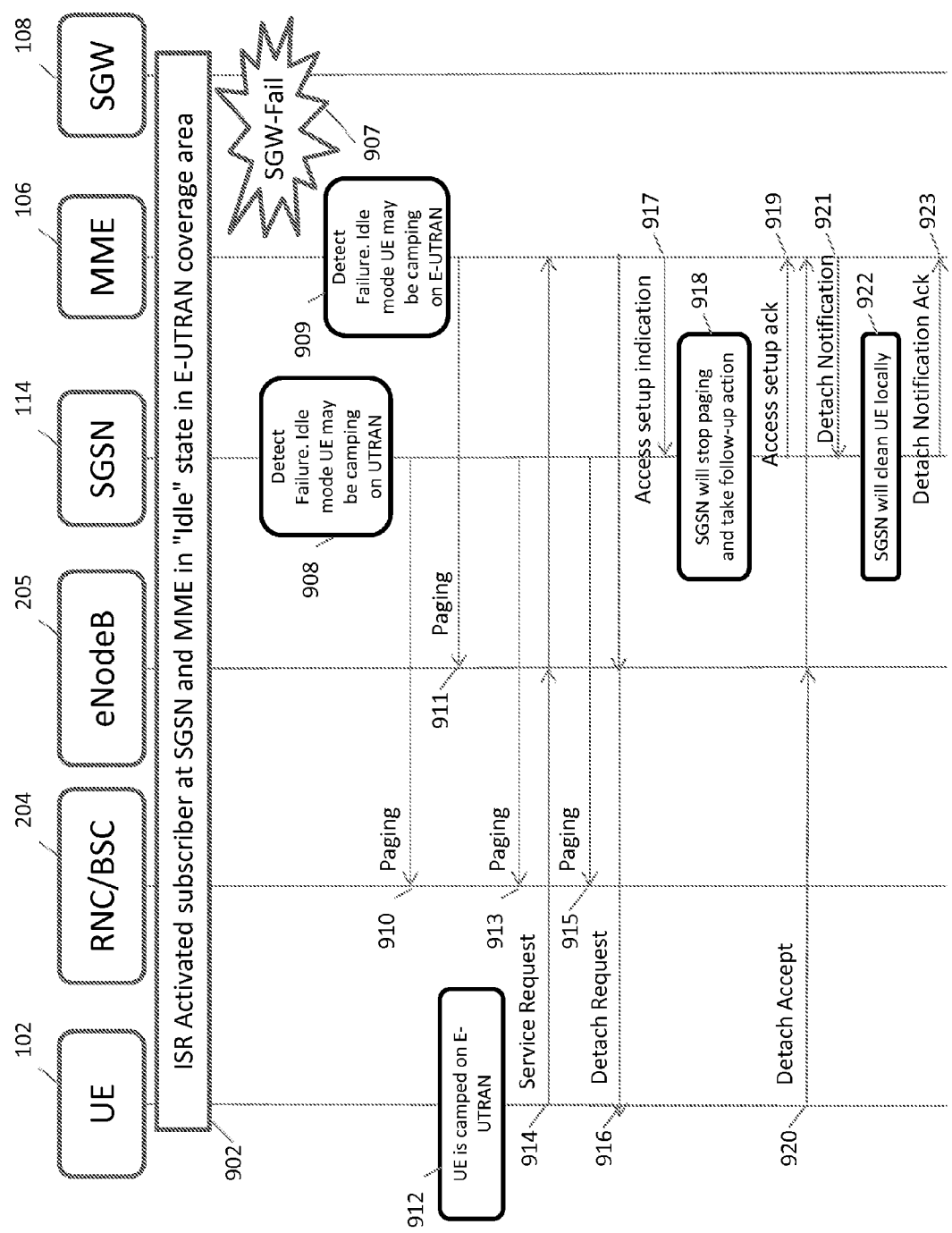
FIG. 9 is a call flow diagram reflecting serving gateway (SGW) path failure handling when ISR is active and the UE is in the IDLE state, in accordance with some embodiments.

FIG. 9 is a call flow diagram reflecting SGW path failure handling when ISR is active and the UE is in the IDLE state, in accordance with some embodiments. On detection of SGW failure, the SGSN and the MME will page the UE simultaneously. In some cases, the UE will camp onto the E-UTRAN coverage area and connect to the MME. The MME, which is now connected to the UE, will send a detach request to the UE. The MME will then send an Access Setup Indication to the SGSN, causing the SGSN to stop paging.

UE 102 is connected both to an LTE network via eNodeB 205 and MME 106, and to a UMTS network via RNC/BSC 204 and SGSN 114. UE 102 is also connected to SGW 108. At step 902, the UE may be in an IDLE state at the MME and in an IDLE state at the SGSN, and ISR has been activated at the UE and MME 106 and SGSN 114.

At step 907, the SGW 108 experiences a failure. At steps 908 and 909, both SGSN 114 and MME 106 detect the failure at the SGW 108. This cause the MME and SGW to try to contact UE 102 to deactivate ISR. Deactivation may be performed using a tracking area update (TAU) or routing area update (RAU) message. This will result in paging being performed by the MME, at step 911, and by the SGSN, at steps 910, 913, and 915, as neither the MME nor the SGSN know whether UE 102 is connected to MME 106 or SGSN 114.

At step 912, the UE 102 appears at the E-UTRAN (not shown), and at step 914, UE 102 sends a service request via eNodeB 205 to MME 106. This results in MME 106 sending a detach request to UE 102 at step 916, and sending an access setup indication to SGSN 114 at step 917. Once SGSN 114 receives the access setup indication, it stops paging, at step 918, and takes appropriate follow-up actions, such as sending access setup acknowledgement message 919 to MME 106. Finally, the detach procedure completes when UE 102 sends a detach acceptance to MME 106 at step 920, MME 106 sends detach notification 921 to SGSN 114, SGSN 114 cleans up the UE locally at step 922, and SGSN also sends detach notification ack 923 to MME 106.

Figure 10:
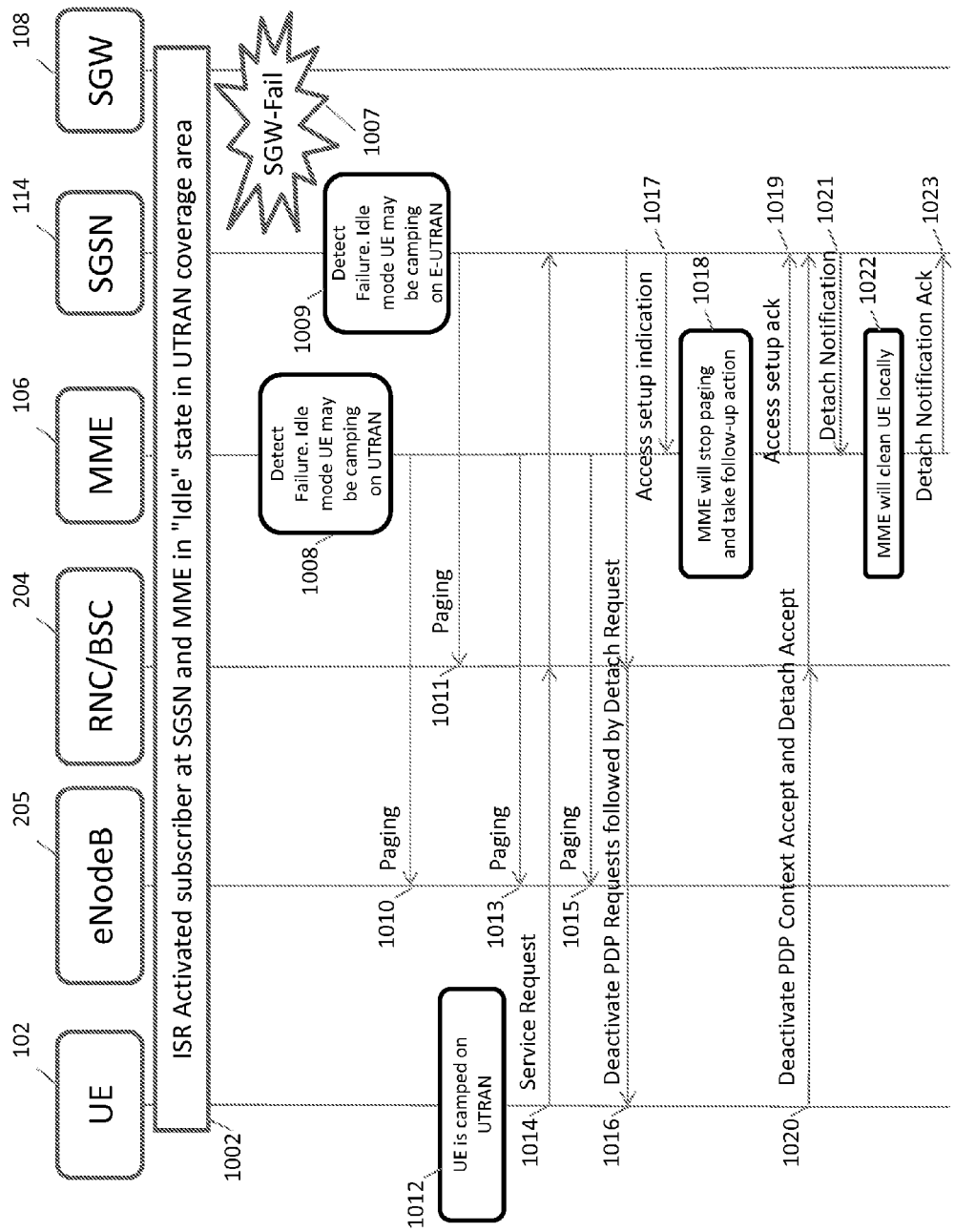
FIG. 10 is a call flow diagram reflecting SGW path failure handling when ISR is active and the UE is in the IDLE state, in accordance with some embodiments.

FIG. 10 is a call flow diagram reflecting SGW path failure handling when ISR is active and the UE is in the IDLE state, in accordance with some embodiments. On detection of SGW failure, the SGSN and the MME will page the UE simultaneously. In some cases, the UE will camp onto the UTRAN coverage area and connect to the SGSN. The SGSN, which is now connected to the UE, will send a detach request to the UE. The SGSN will then send an Access Setup Indication to the MME, causing the MME to stop paging.

UE 102 is connected both to an LTE network via eNodeB 205 and MME 106, and to a UMTS network via RNC/BSC 204 and SGSN 114. UE 102 is also connected to SGW 108. At step 1002, the UE may be in an IDLE state at the MME and in an IDLE state at the SGSN, and ISR has been activated at the UE and MME 106 and SGSN 114.

At step 1007, the SGW 108 experiences a failure. At steps 1008 and 1009, both SGSN 114 and MME 106 detect the failure at the SGW 108. This cause the MME and SGW to try to contact UE 102 to deactivate ISR. Deactivation may be performed using a tracking area update (TAU) or routing area update (RAU) message. This will result in paging being performed by the SGSN, at step 1013, and by the MME, at steps 1010, 1013, and 1015, as neither the MME nor the SGSN know whether UE 102 is connected to MME 106 or SGSN 114.

At step 1012, the UE 102 appears at the UTRAN (not shown), and at step 1014, UE 102 sends a service request via RNC/BSC 204 to SGSN 114. This results in SGSN 114 sending a deactivate packet data protocol (PDP) request and a detach request to UE 102 at step 1016, and sending an access setup indication to MME 106 at step 1017. Once MME 106 receives the access setup indication, it stops paging, at step 1018, and takes appropriate follow-up actions, such as sending access setup acknowledgement message 1019 to SGSN 114. Finally, the detach procedure completes when UE 102 sends a deactivate PDP context acceptance and detach acceptance to SGSN 114 at step 1020, SGSN 114 sends detach notification 1021 to MME 106, MME 106 cleans up the UE locally at step 1022, and MME also sends detach notification ack 1023 to SGSN 114.

Figure 11:
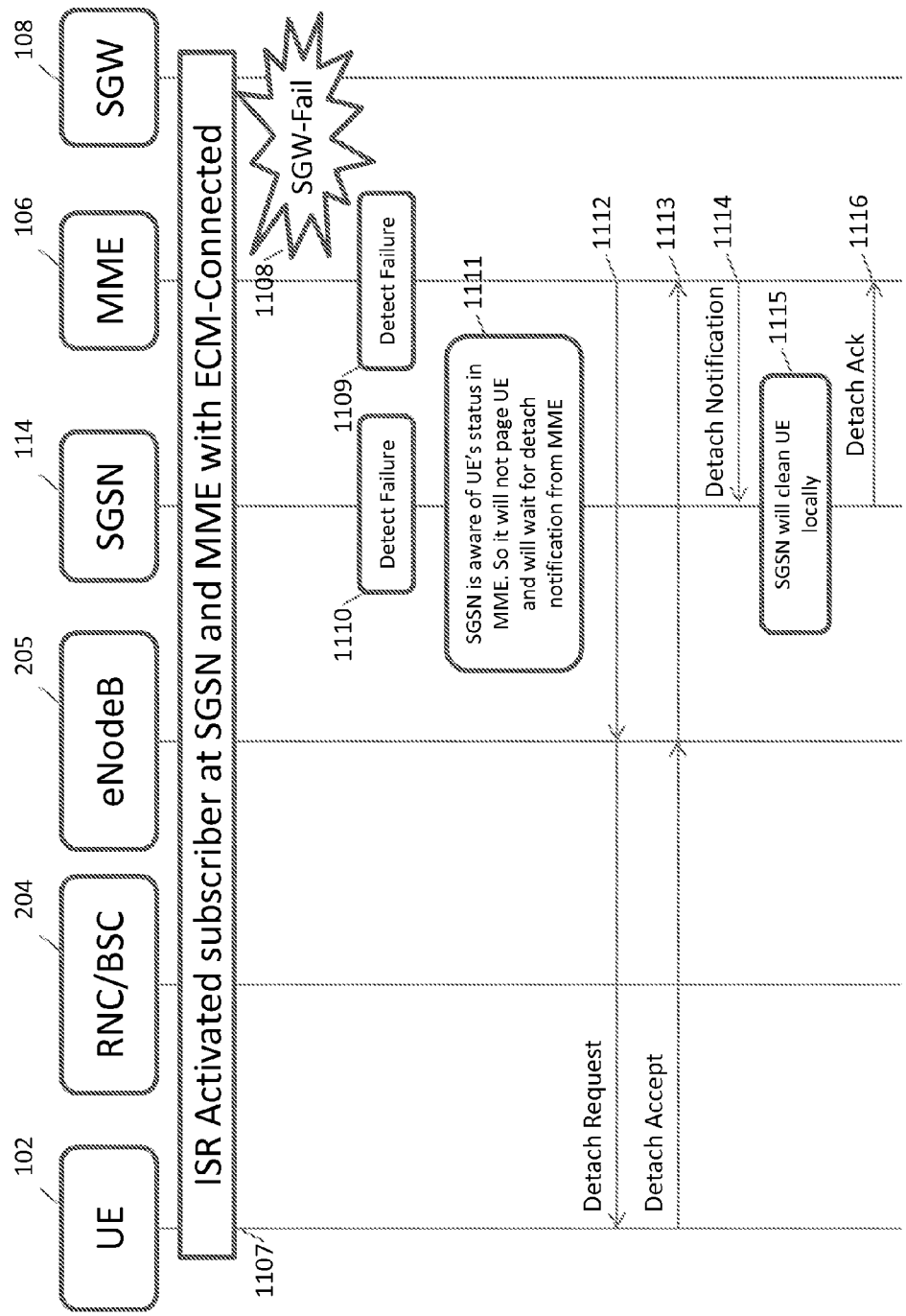
FIG. 11 is a call flow diagram reflecting SGW path failure handling when ISR is active and the UE is in the ECM-CONNECTED state, in accordance with some embodiments.

FIG. 11 is a call flow diagram reflecting SGW path failure handling when ISR is active and the UE is in the ECM-CONNECTED state, in accordance with some embodiments. On detection of SGW failure, the MME will send a detach request to the UE. As the SGSN has previously been made aware of the UE's status at the MME, on detection of SGW failure the SGSN may choose not to perform paging and instead will wait for a detach notification from the MME.

UE 102 is connected both to an LTE network via eNodeB 205 and MME 106, and to a UMTS network via RNC/BSC 204 and SGSN 114. The UE may be in a ECM-CONNECTED state at the MME and in an IDLE state at the SGSN. UE 102 is also connected to SGW 108. At step 1107, ISR has been activated at the UE and MME 106 and SGSN 114.

At step 1108, the SGW 108 experiences a failure. At steps 1109 and 1110, both SGSN 114 and MME 106 detect the failure at the SGW 108 and initiate detach procedures. Unlike in FIG. 9, SGSN 114 does not perform paging. This is because, as reflected at step 1111, the SGSN is aware that the UE is in communication with the MME. Instead, SGSN 114 waits for a detach notification from the MME.

At step 1112, MME 106 sends a detach request to UE 102 via eNodeB 205. At step 1113, UE 102 sends a detach acceptance to the MME via eNodeB 205. This is followed at step 1114 by the MME 106 sending a detach notification to the SGSN 114. At step 1115, the SGSN performs local cleanup procedures, and at step 1116, the SGSN sends a detach acknowledgement to the MME 106, completing the detach procedure.

Figure 12:
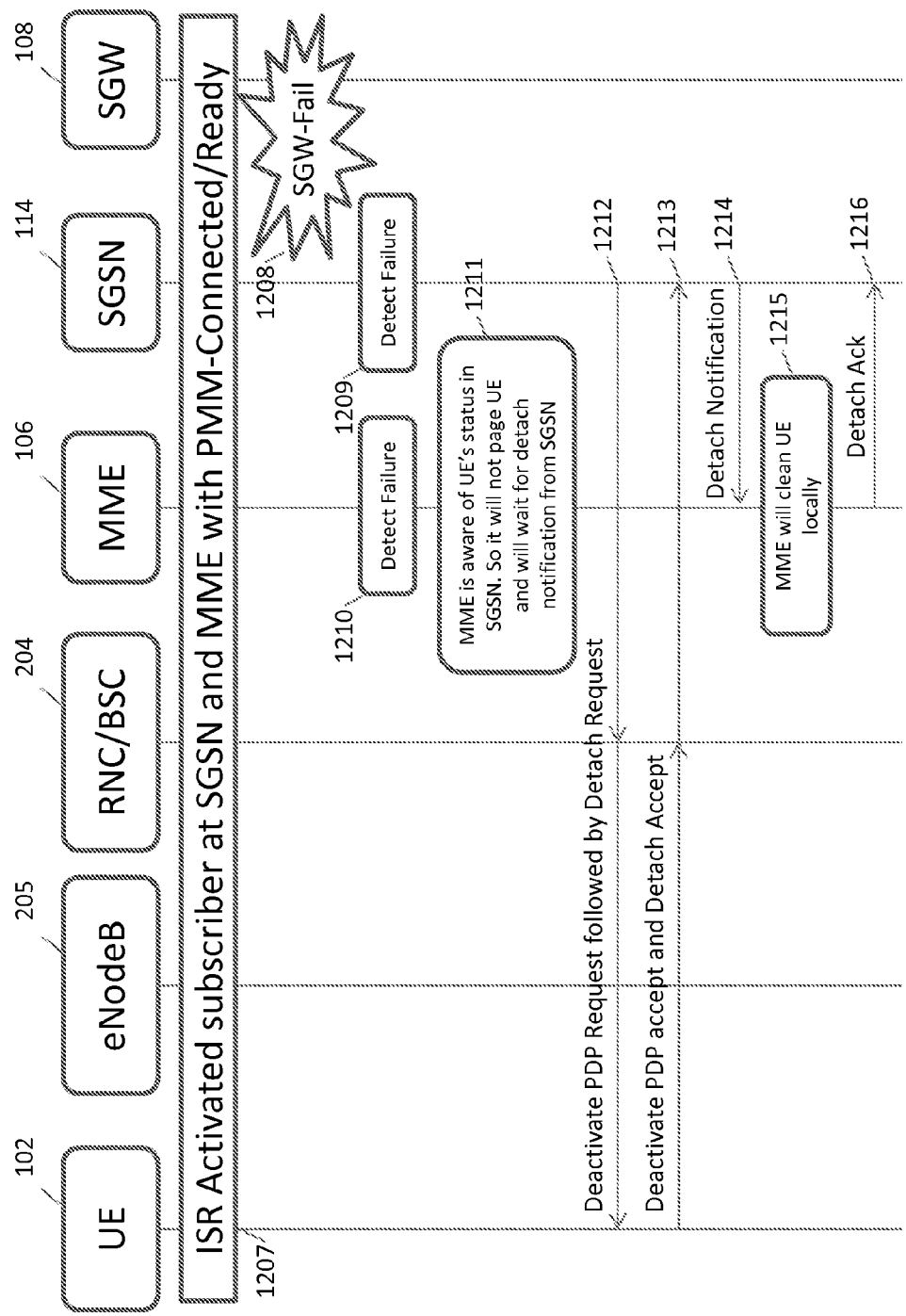
FIG. 12 is a call flow diagram reflecting SGW path failure handling when ISR is active and the UE is in the PMM-CONNECTED state, in accordance with some embodiments.

FIG. 12 is a call flow diagram reflecting SGW path failure handling when ISR is active and the UE is in the PMM-CONNECTED state, in accordance with some embodiments. UE 102 is connected both to an LTE network via eNodeB 205 and MME 106, and to a UMTS network via RNC/BSC 204 and SGSN 114. The UE may be in a PMM-CONNECTED state at the SGSN and in an IDLE state at the MME. UE 102 is also connected to SGW 108. At step 1207, ISR has been activated at the UE and MME 106 and SGSN 114. Unlike in FIG. 10, prior echo messages (not shown) have allowed SGSN 114 and MME 106 to share information about the last known location of the UE.

At step 1208, SGW 108 experiences a failure. At steps 1209 and 1210, the SGSN 114 and MME 106, respectively, detect the failure at the SGW 108 and initiate detach procedures. Unlike in FIG. 10, MME 106 is aware of the UE's status at the SGSN, and thus may choose not to page UE 102; instead, at step 1211, the MME waits for a detach notification from the SGSN. At step 1212, the SGSN 114 sends a deactivate PDP request, followed by a detach request, to UE 102. At step 1213, UE 102 responds with acceptance of both these requests. At step 1214, SGSN 114 sends a detach notification to MME 106. At step 1215, the MME 106 performs local cleanup procedures, and at step 1216, the MME sends a detach acknowledgement to SGSN 114, completing the detach procedure.

The case of PGW-initiated bearer deactivation is similar to the cases covered above for bearer deactivation on SGW failure, in some embodiments. When ISR is active and the UE is in the ECM-CONNECTED state through a MME, and the PGW initiates a bearer deactivation, first, the PGW sends a Delete Bearer Request to SGW. The SGW forwards the Delete Bearer Request to both SGSN and MME. The MME will ask UE to deactivate the bearer, whereas the SGSN will page the UE. Notably, with the present disclosure the paging by SGSN can be avoided if the SGSN is aware that UE is already in a connected state at MME. This procedure is switched in some embodiments when the UE is in the PMM-CONNECTED state at an SGSN.

Figure 13:
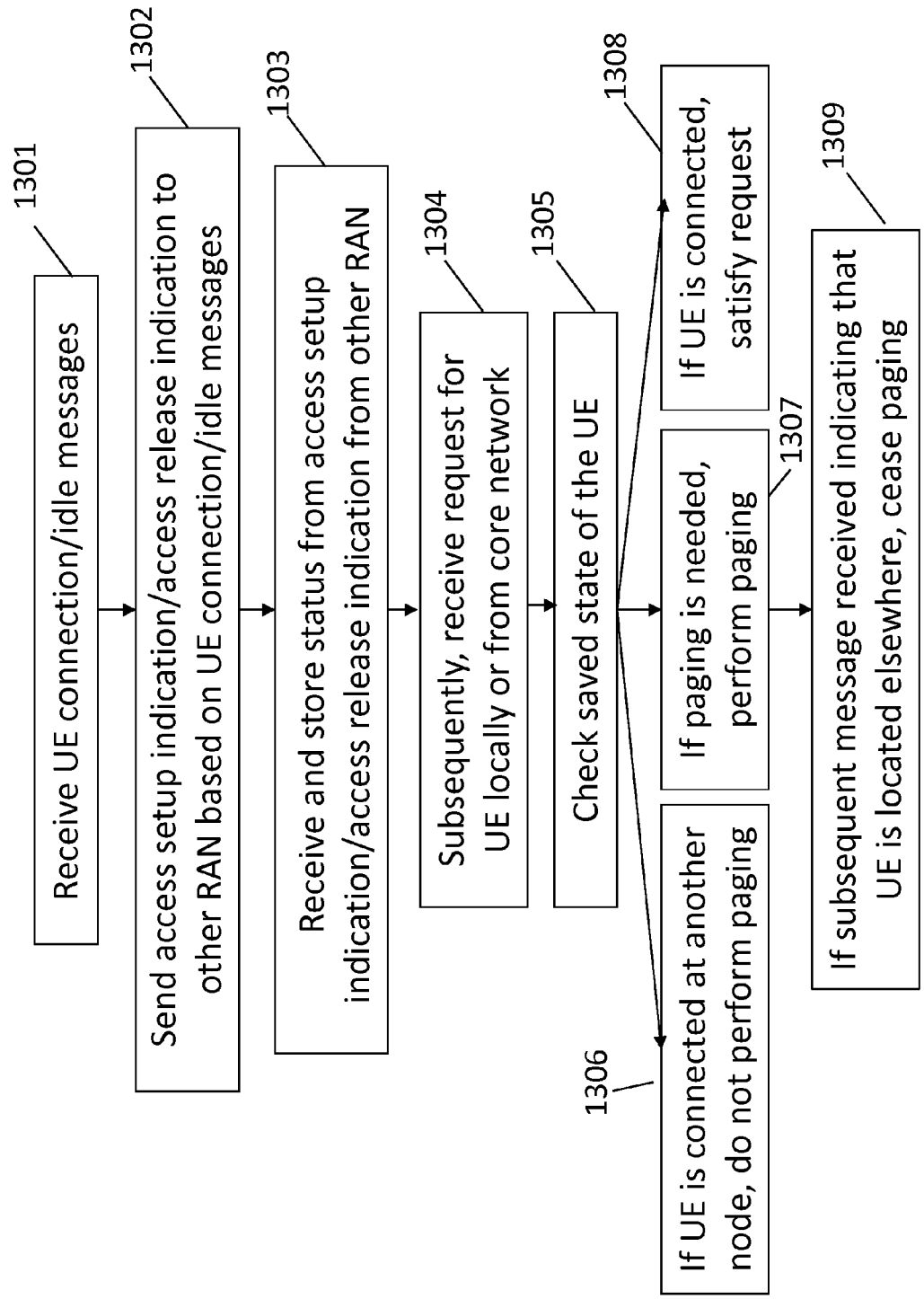
FIG. 13 is a flowchart depicting inter-radio access technology (RAT) UE attachment notification, in accordance with some embodiments.

FIG. 13 is a flowchart depicting inter-RAT UE attachment notification, in accordance with some embodiments. In FIG. 13, a core network node, such as an SGSN or a MME, is in communication with a UE and with a core network. The UE may be on more than one radio access network.

At step 1301, the core network node receives UE connection/idle messages from the UE, reflecting the UE attaching to or detaching from the core network node. At step 1302, the core network node sends access setup indication/access release indication messages to the core network node managing the other RAN based on UE connection/idle messages. In the case that the core network node is the MME, the other core network node is the SGSN, and vice versa.

At step 1303, as well as sending access setup indication/access release indication messages with information regarding the UE, the core network node also receives and stores status from access setup indication/access release indication messages received from the other RAN. At step 1304, the core network node subsequently receives a request for UE from the core network. This may be a downlink data notification, paging request, SGW failure message, HSS-initiated bearer detach message, or other message. At step 1305, before the core network node initiates paging of the UE in order to pass on the relevant message, the core network node may consult the saved state of the UE at its own RAT and also at any other RAT for which it has previously received information.

At step 1306, if the UE is not connected but the UE is connected at another RAT, the core network node may choose not to perform paging. Instead, the core network node may, for example, fail silently, perform detach operations, forward data to the corresponding RAT, or send messages back to the core network indicating that the UE is attached to the corresponding node. At step 1307, if the UE is not connected at the other RAT management node, the core network node may perform paging if needed to reactivate the UE. At step 1308, if the UE is connected, the core network node may satisfy the incoming request without paging. Finally, at step 1309, if subsequent messages are received indicating that the UE is attached or connected elsewhere, the core network node may choose to cease paging at that point.

Figure 14:
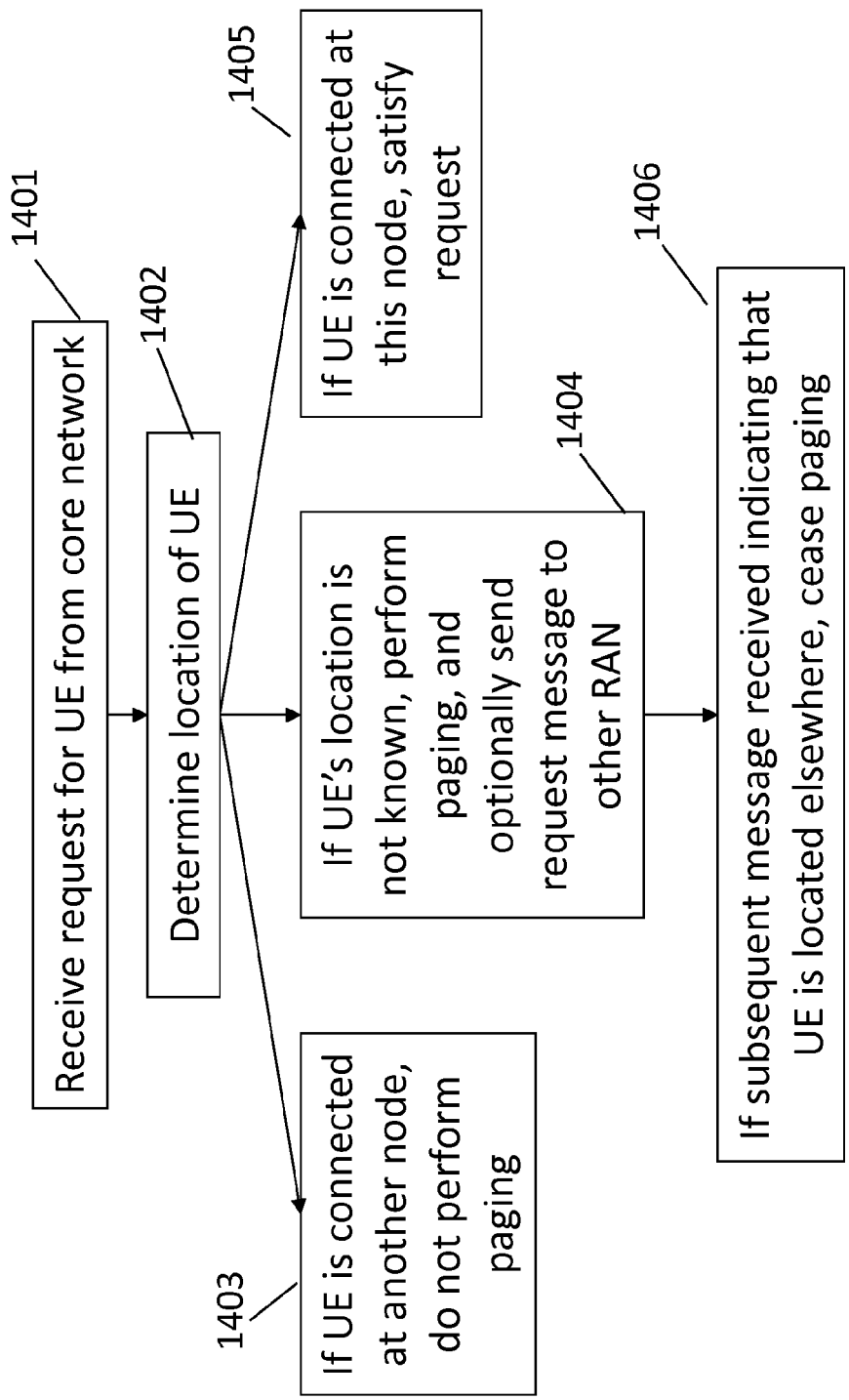
FIG. 14 is a flowchart depicting inter-RAT UE attachment notification using requests and responses, in accordance with some embodiments.

FIG. 14 is a flowchart depicting inter-RAT UE attachment notification using requests and responses, in accordance with some embodiments. In FIG. 14, a core network node, such as an SGSN or a MME, is in communication with a UE and with a core network. The UE may be on more than one radio access network.

At step 1401, the core network node receives messages from the core network, requesting that the UE detach from the core network, or requesting that the UE connect to the network to retrieve data (i.e., a downlink data notification), or requesting other UE activity. At step 1402, the core network node may execute a procedure to determine the current RAT of the UE. This may be done by evaluating the UE's connection state with regard to the core network node. For example, if the core network node is a MME, and the UE is currently in state ECM-CONNECTED, the UE can be determined to be camped at the MME.

At step 1403, if the UE's location is not at the core network node but is known (i.e., if the UE is camped on another RAT or network), the core network node may send a reply message to the core network without unnecessarily paging the UE. At step 1405, if UE is connected at the core network node, the core network node may satisfy the request by passing it along to the UE over the active connection.

However, if the UE is not camped at the UE, or if the UE is in an IDLE state, the core network node may not be able to conclusively determine the location of the UE. At step 1404, if the UE's location is not known, the core network node may send a request message to one or more other network nodes requesting information about the UE. The UE may be specified using an identifier that may include an IMSI, a TMSI, or another identifier. The other network nodes are nodes that manage other RANs, and may also be configured to respond to the request message indicating whether the UE is camped at the corresponding node. For example, if the UE is not camped at the core network node's radio access technology, the core network node may query a particular core network node on another radio access technology to see if the UE is camped on the corresponding radio access network. The core network node may receive the response and store the response locally.

At step 1406, if the core network node subsequently receives a message indicating that the UE is connected to another RAT or another network, the core network node may cease paging and may return an appropriate response to the core network.

Alternate Embodiments

In some embodiments, instead of a MME and a SGSN informing each other about the setup/teardown of a signaling connection with the UE on each setup/teardown, the local node may perform an explicit query of the remote node about UE connection status only when required to page. The query may be using existing S3 messages, echo messages, new S3 messages, or other messages as required, in certain embodiments. Each node may be enabled to query the other; however, in the case that a local node has received a query from the remote node, it may not need to perform a query of the remote node. The query and/or the response may be configured to include the UE's connection status at the local node (i.e. the node sending the query or response). The query and response may be configured to include timestamps.

For example, in some embodiments, when a MME and a SGSN are both asked to perform paging for a UE, the node that receives the trigger first can send an echo message to the corresponding node that serves as a query to determine the state of the UE at the remote node. If the state is other than IDLE at the remote node, paging can be avoided by the local node. In some embodiments, the local node may return a status message to the core network to indicate that the UE is located at the other access network; in other embodiments, no response may be required from the local node, as the remote node will respond to the paging request.

In some embodiments, the present system modifies the call flow to enable processing of Cancel-location (Subscription-withdrawn) messages for an ISR-activated subscriber in the ECM-Connected state. The MME will send a detach request to the UE, which will respond back with a detach acceptance. The SGSN will do paging and on all paging expiry send an acknowledgement message, or "ack," to HSS.

In some embodiments, the present system modifies the call flow to process Cancel-location (Subscription-withdrawn) for ISR activated subscriber with PMM-Connected/Ready state. The SGSN will send a detach request to the UE, and the UE will respond back with a detach acceptance. The MME can perform paging, and on all paging expirations, the MME can send an ack to the HSS.

UE Active RAT Notification

An alternative embodiment is described below called UE Active RAT Notification. The UE Active RAT notification technique may be used to address the problem of SGW failure and restart, in some embodiments. The use of an explicit deactivation request, and deactivation of PDP contexts or bearers, may differ from certain other embodiments described herein. The UE Active RAT notification message is a new S3 message that provides information about which RAT the UE is connected to, thus improving latency and reducing radio resource utilization.

In some embodiments, at an initial time, ISR is active and each of the MME, SGSN, and SGW have the ISR state of the UE. ISR remains active when an ISR state is maintained at the UE, the MME, the SGSN and the SGW. In the case of SGW failure, the SGW loses all UE contexts, and it is complex to rebuild the UE context at the SGW such that ISR can also be activated again without additional querying. For this reason, while the UE session is being restored via another SGW or restarted SGW, ISR may be deactivated at each of the UE, the MME, and the SGSN when an SGW failure or SGW restart is detected. In order to deactivate ISR at all impacted UEs, each UE may be brought into the active state.

For UEs which are already in an active state at the MME or at the SGSN, there is no paging needed. However, if the UE is in an active state at the SGSN, the MME will assume that the UE is in an idle state. Similarly, if the UE is in an active state at the MME, the SGSN will assume that the UE is in an idle state. It follows that the node that assumes that the UE is in idle state will initiate paging. For the UEs which are in idle state, the MME and SGSN both have to page the UE to find out if the UE is camping on either the E-UTRAN or UTRAN. Only one node will succeed in the paging procedure, and will cause the UE to initiate a Service Request procedure at the RAT on which it is currently camping. The corresponding RAT node (i.e. the SGSN if the UE is camping on the E-UTRAN and the MME if the UE is camping on the GERAN/UTRAN) will continue paging unless a message is sent to cancel paging. UE Active RAT notification should be sent for such UEs to cause the corresponding node to refrain from initiating an unnecessary paging procedure, or to cause the corresponding node to stop a paging procedure that is already in progress.

In some embodiments, if the UE state is ECM-IDLE at the MME when the MME becomes aware of the failure of SGW 108, MME 106 has not recently had communication with UE 102 and is unsure about its state. The MME first pages the UE to bring it to ECM-CONNECTED. If the UE does not come online, the UE may be out of range of the MME or may be already connected to another RAT. In this case, the MME reduces short-spaced retransmissions. The MME also checks to see if a UE Active RAT notification message has been received from SGSN; if yes, the MME will release its own UE session, as the SGSN has indicated that the UE is connected over the GERAN/UTRAN RAT.

In some cases, neither the MME nor the SGSN will be able to reach the UE. In these cases, the MME and SGSN will both page until a timeout occurs. On timeout, the MME will release the PDN connection context and UE MM context, and will assume that the UE is in the GERAN/UTRAN coverage area.

In some embodiments, when the SGW receives data for a UE and sends a Downlink Data Notification to an MME or SGW, a DDN message may cause the MME and SGW to initiate paging. When the UE camps on either the E-UTRAN or the UTRAN and responds to one of the core network nodes, the corresponding node will continue paging. The core network node with the active connection may send a UE active RAT notification to the corresponding node.

Figure 15:
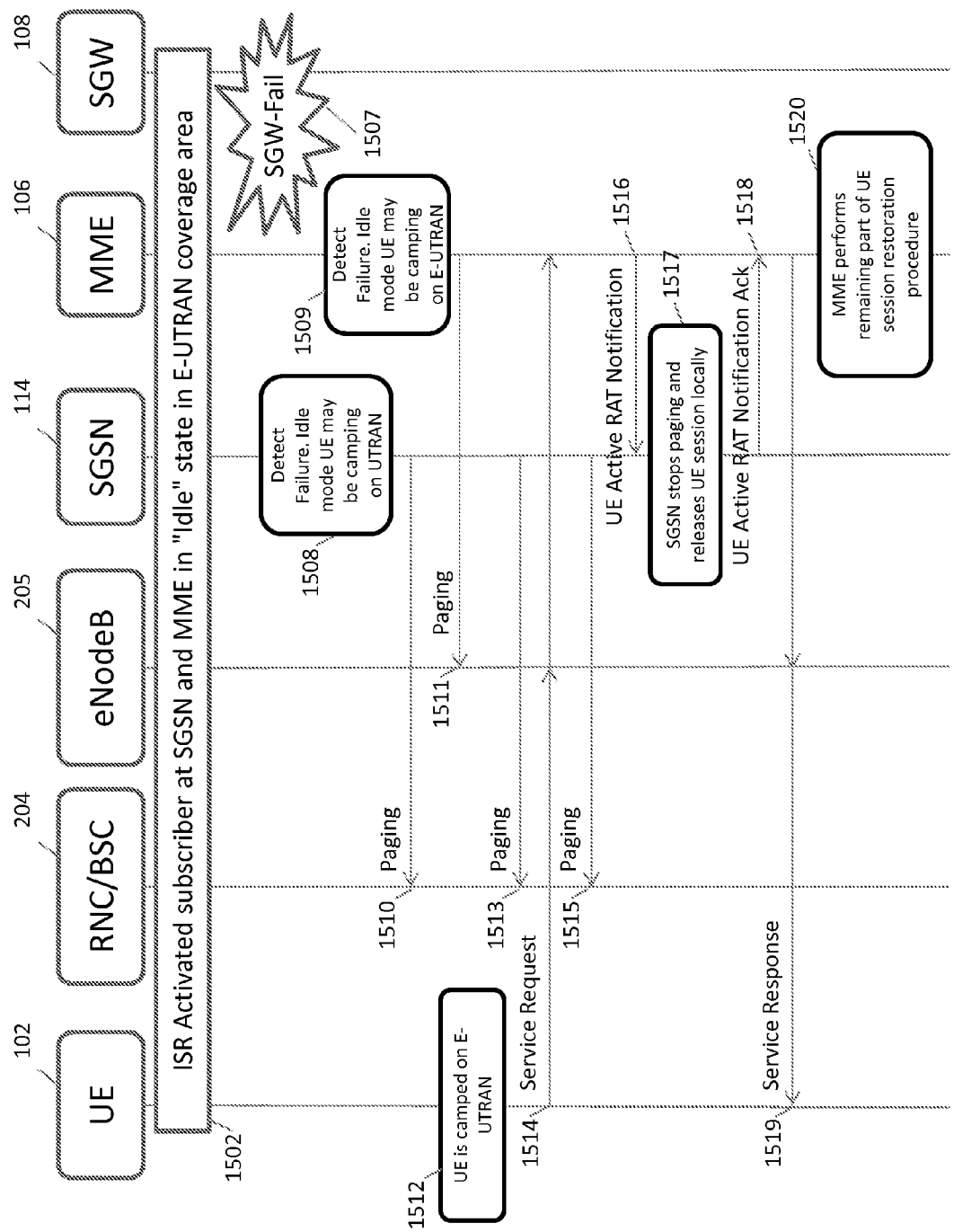
FIG. 15 is a call flow diagram reflecting UE Active RAT Notification handling when ISR is active and the UE is IDLE, in accordance with some embodiments.

FIG. 15 is a call flow diagram reflecting UE Active RAT Notification handling when ISR is active and the UE is in the IDLE state in the E-UTRAN coverage area, in accordance with some embodiments. UE 102 is connected both to an LTE network via eNodeB 205 and MME 106, and to a UMTS network via RNC/BSC 204 and SGSN 114. The UE may be in an IDLE state at the MME and the SGSN. UE 102 is also connected to SGW 108.

At step 1502, ISR has been activated at the UE 102, MME 106, SGSN 114, and SGW 108. At step 1507, SGW 108 fails. At step 1508, the failure may be detected by SGSN 114. At step 1509, the failure may be detected by MME 106. Failure detection may be by the use of GTP echo messages from the SGW or from other hosts. Once the failure is detected, assuming SGW restoration procedures are supported within the core network, both the MME and the SGSN will initiate these restoration procedures to restore the UE session via a newly-selected SGW or via a restarted SGW. Restoration procedures allow for the creation or reuse of a UE session without detaching the previously-existing UE session, thereby reducing the need for detach and attach messaging, and is further described in 3GPP Technical Report (TR) 23.857. These restoration procedures may be used in conjunction with other embodiments described herein.

At this time, since ISR cannot be maintained after a SGW failure, the MME and the SGSN may proceed to locally deactivate the ISR. However, at this point, the MME and the SGSN are both maintaining the UE session, since it is not known which RAT the UE is currently camped on. Hence, to learn which the RAT the UE is currently camped on, and also to indicate the deactivation of the ISR state, the MME and the SGSN initiate paging procedures to wake up UE 102, which is IDLE.

At steps 1510, 1513, and 1515, SGSN 114 attempts to wake up UE 102 in order to deactivate ISR at the UE. However, UE 102 is camped on the E-UTRAN, and in response to a page at step 1511 from MME 106, wakes up and camps on the E-UTRAN at step 1512. At step 1514, UE 102 sends a service request via eNodeB 205 to MME 106. At step 1516, MME 106 chooses to inform SGSN 114 about the UE reconnecting at step 1514; this information is transmitted via a special S3 message, the UE Active RAT Notification message. The UE Active RAT Notification message indicates that the UE is active on the RAT of the sender, which in this case is MME 106. This message is defined as a new type of S3 message, and is handled according to other messages of the S3 protocol. The UE Active RAT Notification may include a deactivation request, and may cause PDP contexts or bearers to be deactivated as a result of receiving the notification message. At step 1517, this message causes the SGSN to release the UE session, as the SGSN is now aware that UE 102 is connected to the MME. This also causes the SGSN to not initiate paging, thereby reducing paging, if the SGSN would have otherwise performed paging. This achieves the goals of signaling reduction, radio resource conservation, and latency reduction. Throughout this period, SGSN 114 continues paging the UE.

At step 1517, as stated above, SGSN 114 receives the UE Active RAT notification. It then stops paging and takes follow-up actions, including releasing the session locally. At step 1518, SGSN 114 sends an UE Active RAT notification acknowledgement message to MME 106. At step 1519, MME 106 sends service response message to UE 102. Finally, MME 106 performs any remaining UE session restoration procedures necessary to reestablish the previously-active session with the UE. In the case where session restoration procedures are not performed, MME 106 may use detach/reattach messaging instead of session restoration procedures.

In some embodiments, UE Active RAT notification messages may be sent from SGSN to MME. The case in which this may occur is when the UE is camped on the UTRAN, and responds to paging from the SGSN. The call flow for this instance is substantially similar to FIG. 15, with the exception that service request 1514 is directed to SGSN 114, UE Active RAT notification 1516 is directed from SGSN 114 to MME 106, and UE Active RAT notification acknowledgement 1518 is directed from MME 106 to SGSN 114. Step 1517 is also performed at the MME 106, and step 1520 is also performed at SGSN 114.

Figure 16:
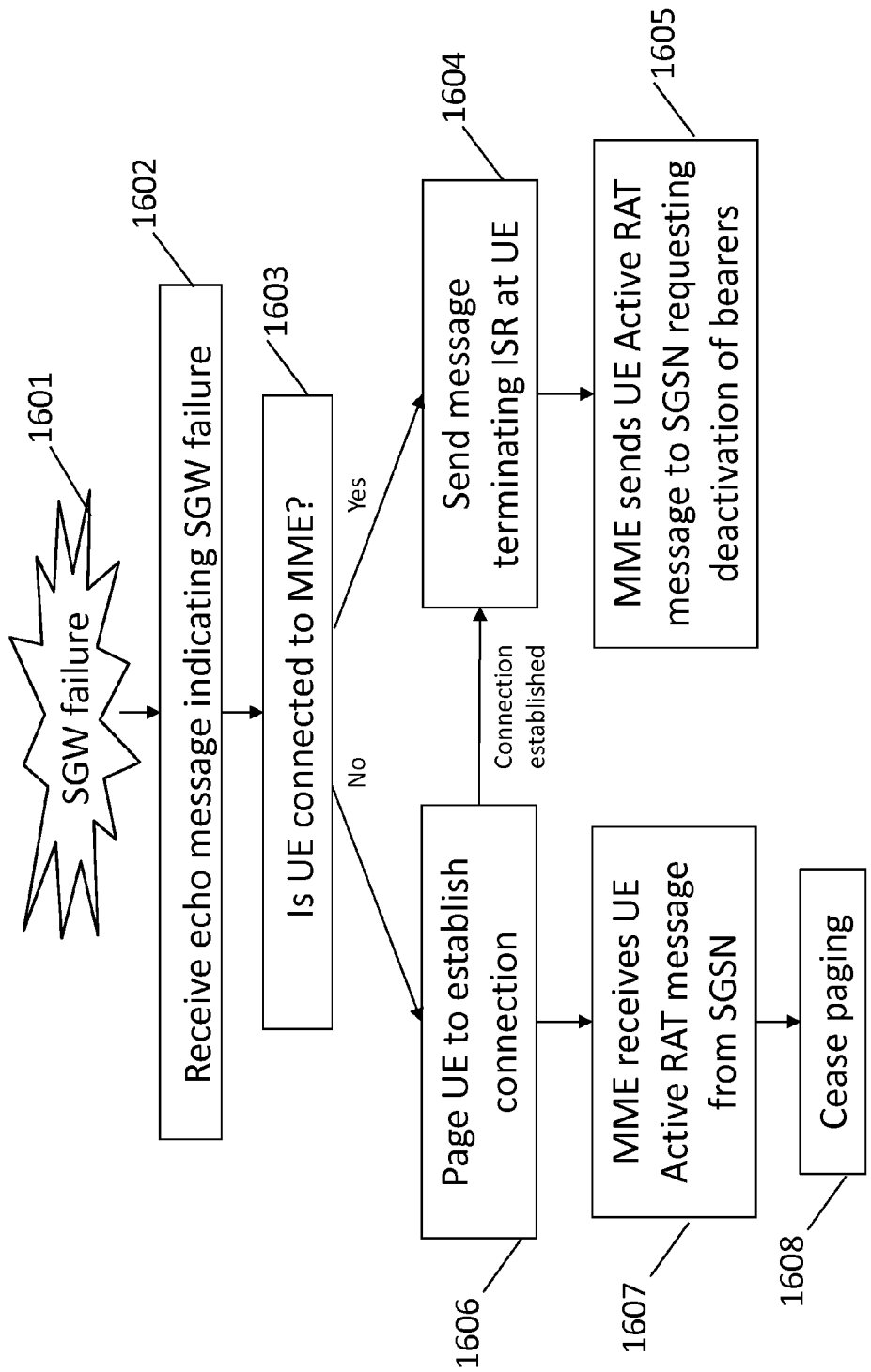
FIG. 16 is a flowchart depicting inter-RAT UE attachment notification using UE Active RAT notification, in accordance with some embodiments.

FIG. 16 is a flowchart depicting inter-RAT UE attachment notification using UE Active RAT notification, in accordance with some embodiments. In FIG. 16, a MME is referenced in communication with a UE and with a core network. However, in some embodiments an SGSN or other core network node may implement the steps described. At step 1601, an upstream SGW experiences a failure. At step 1602, echo messages indicate the failure to the MME. At step 1603, the MME determines whether the UE is currently in the ECM-CONNECTED state; if it is not, it pages the UE at step 1606. If the UE is already connected, or if a connection is successfully established, a message may be sent terminating ISR to the UE at step 1604. Next, at step 1605, the MME sends a UE Active RAT Notification message to a SGSN requesting termination of paging procedure and deactivation of bearers at the SGSN.

In some embodiments, the MME may not successfully establish a connection to the UE; instead, a SGSN may establish a connection to the UE instead. At step 1607, which occurs simultaneously or prior to step 1606, the MME may receive a UE Active RAT Notification message from the SGSN. If it does so, it immediately stops paging the UE at step 1608, because the message indicates that the UE is in communication with the SGSN and that the MME need not complete the requested connection task.

Hardware and Software

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iOS, RIM'S Blackberry, Windows Mobile, Linux, Palm WebOS, or Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The system for media enhancement described above may be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a femto base station, which would connect to the gateway using a broadband network. A person or corporation may use a femto base station in a home or business to support one or more mobile nodes. The gateway can provide trigger based traffic management during a handoff from a femto base station to a macro base station, while maintain traffic management for the mobile node. The media delivery enhancement gateway can be implemented as any combination of the following including an xGSN, an xGW, an xGW-SGW, and an xGW-PGW.

In some embodiments the network device can be implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below.

Figure 17:
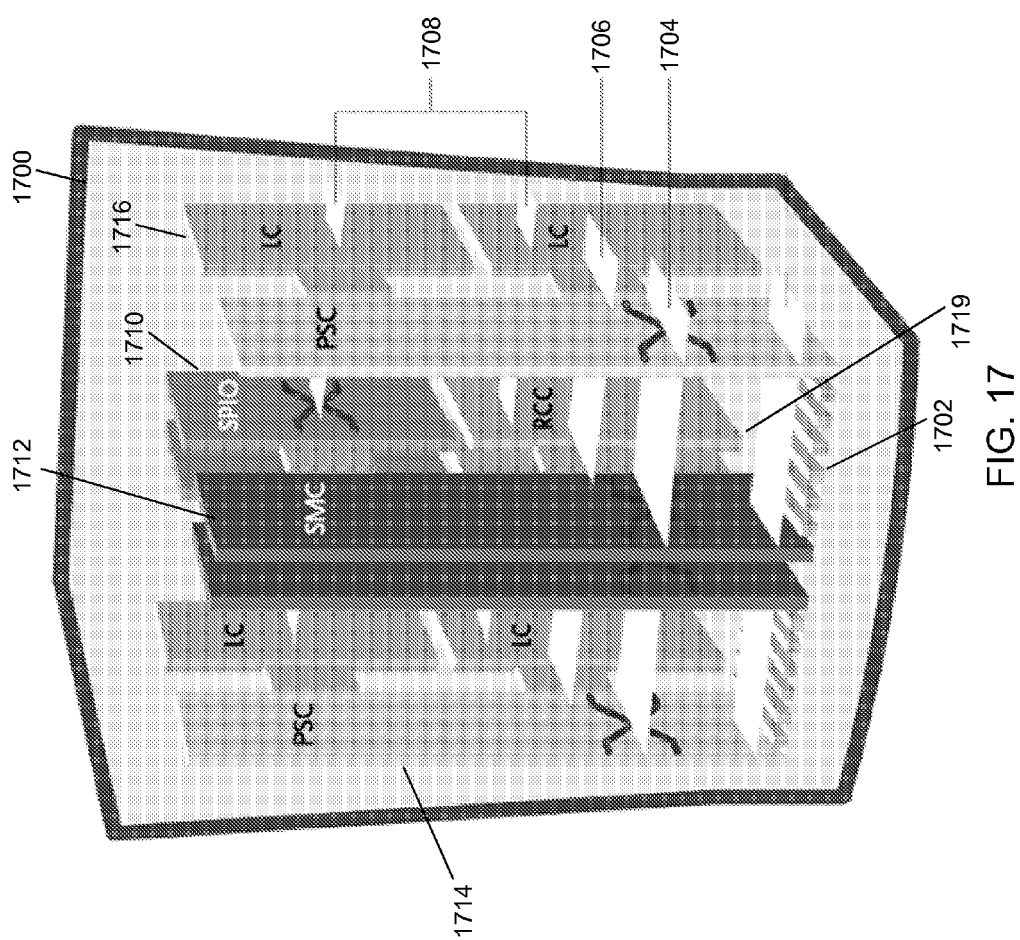
FIG. 17 illustrates the hardware architecture of a network device in accordance with some embodiments.

FIG. 17 illustrates the implementation of a network device, in accordance with some embodiments. The network device 1700 includes slots 1702 for loading application cards and line cards. A midplane can be used in the network device to provide intra-network device communications, power connections, and transport paths between the various installed cards. The midplane can include buses such as a switch fabric 1704, a control bus 1706, a system management bus, a redundancy bus 1708, and a time division multiplex (TDM) bus. The switch fabric 1704 is an IP-based transport path for user data throughout the network device implemented by establishing inter-card communications between application cards and line cards. The control bus 1706 interconnects the control and management processors within the network device. The network device management bus provides management of system functions such as supplying power, monitoring temperatures, board status, data path errors, card resets, and other failover features. The redundancy bus 1708 provides transportation of user data and redundancy links in the event of hardware failures. The TDM bus provides support for voice services on the system.

The operating system software can be based on a Linux software kernel and run specific applications in the network device such as monitoring tasks and providing protocol stacks. Alternately, the operating system software may be based on Cisco iOS, Cisco CatOS, Cisco IOS XR, Juniper JUNOS, QNX, or other operating system. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will be insulated from that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 18:
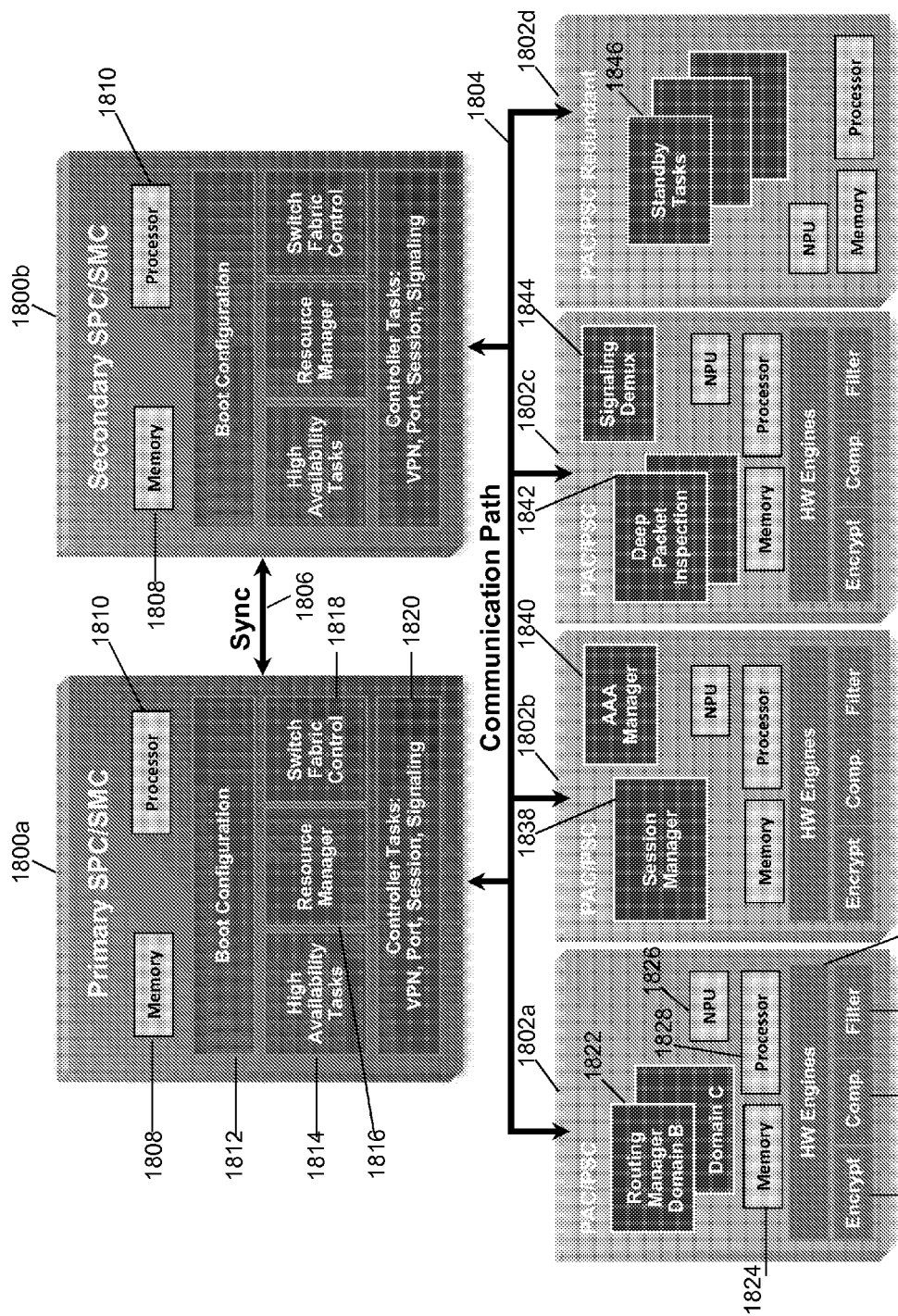
FIG. 18 illustrates a logical view of the software architecture of a network device in accordance with certain embodiments.

FIG. 18 illustrates a logical view of the software architecture of a network device in accordance with certain embodiments. As shown, the software and hardware can be distributed within the network device and across different circuit boards, processors, and memory. FIG. 18 includes a primary switch processor card (SPC)/system management card (SMC) 1800*a*, a secondary SPC/SMC 1800*b*, PAC/PSC 1802*a*-1802*d*, a communication path 1804, and a synchronization path 1806. The SPC/SMC 1800 include a memory 1808, a processor 1810, a boot configuration 1812, high availability tasks 1814, resource manager 1816, switch fabric control 1818, and controller tasks 1820.

The SPC/SMC 1800 manage and control the network device including the other cards in the network device. The SPC/SMC 1800 can be configured in a primary and secondary arrangement that provides redundancy and failsafe protection. The modules or tasks running on the SPC/SMC 1800 are related to network device wide control and management. The boot configuration task 1812 includes information for starting up and testing the network device. The network device can also be configured to startup in different configurations and providing different implementations. These can include which functionalities and services are capable of running on the SPC/SMC 1800. The high availability task 1814 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1800 or a PAC/PSC 1802, while some processor intensive tasks can also be performed across multiple PACs/PSCs to utilize multiple CPU resources. Distribution of these tasks is invisible to the user. The switch fabric control 1818 controls the communication paths in the network device. The controller tasks module 1820 can manage the tasks among the resources of the networks to provide, for example, VPN services, assign ports, and create, delete, and modify sessions for user equipment.

The PAC/PSC 1802 are high-speed processing cards that are designed for packet processing and the tasks involved with providing various network functionalities on the network device. The PAC/PSC 1802 include a memory 1824, a network processing unit (NPU) 1826, a processor 1828, a hardware engine 1830, an encryption component 1832, a compression component 1834, and a filter component 1836. Hardware engines 1830 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1802 is capable of supporting multiple contexts. The PAC/PSC 1802 are also capable of running a variety of tasks or modules. PAC/PSC 1802*a* provides routing managers 1822 with each covering routing of a different domain. PAC/PSC 1802*b* provides a session manager 1838 and an AAA manager 1840. The session manager 1838 manages one or more sessions that correspond to one or more user equipment. A session allows a user equipment to communicate with the network for voice calls and data. The AAA manager 1840 manages accounting, authentication, and authorization with an AAA server in the network. PAC/PSC 1802 provides a deep packet inspection task 1842 and a signaling demux 1844. The deep packet inspection task 1842 provides inspection of packet information beyond layer 4 for use and analysis by the network device. The signaling demux 1844 can provide scalability of services in combination with other modules. PAC/PSC 1802*d* provides redundancy through standby tasks 1846. Standby tasks 1846 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the out-of-band channel may be implemented over a virtual channel over the public Internet.

What is claimed is:

1. A method comprising:
   detecting a failure of a serving gateway (SGW) for a mobile device at a first core network node, the first core network node to communicate with the mobile device via a first radio access technology; and
   in response to the detecting the failure of the SGW, determining, by the first core network node, whether to page the mobile device based, at least in part, on a stored state of the mobile device with respect to a second core network node, the second core network node to communicate with the mobile device via a second radio access technology.

2. The method of claim 1, wherein the determining, by the first core network node, whether to page the mobile device is further based on a determination that the mobile device is in an active state with respect to the first core network node.

3. The method of claim 1, further comprising receiving, by the first core network node from the second core network node, a message indicating that the mobile device is in an active state with respect to the second core network node.

4. The method of claim 3, wherein the determining, by the first core network node, whether to page the mobile device comprises determining to stop paging the mobile device in response to receiving the message indicating that the mobile device is in an active state with respect to the second core network node.

5. The method of claim 3, wherein the determining, by the first core network node, whether to page the mobile device comprises determining to not page the mobile device in response to detecting the failure of the SGW.

6. The method of claim 1, further comprising causing the mobile device to be brought to an active state with respect to the first core network node subsequent to detecting the failure of the SGW.

7. The method of claim 1, further comprising sending an activity notification message from the first network node to the second network node in response to the mobile device entering an active state with respect to the first core network node, the activity notification message indicating to the second core network node that the mobile device is active with respect to the first core network node.

8. The method of claim 1, further comprising requesting deactivation of bearers associated with the mobile device at the second core network node on the second radio access technology.

9. The method of claim 1, further comprising sending a detach notification from the first core network node to the second core network node.

10. The method of claim 1, further comprising in response to the detection of the failure of the SGW, querying the second core network node about the state of the mobile device with respect to a second core network node.

11. The method of claim 1, wherein the first core network node is a Mobility Management Entity (MME), the second core network node is a Serving General Packet Radio System (GPRS) Support Node (SGSN), and the mobile device is a user equipment (UE).

12. The method of claim 1, wherein the first core network node is a Serving General Packet Radio System (GPRS) Support Node (SGSN), the second core network node is a Mobility Management Entity (MME), and the mobile device is a user equipment (UE).

13. The method of claim 1, wherein the determining, by the first core network node, whether to page the mobile device comprises determining to not page the mobile device in response to detecting the failure of the SGW and determining that the stored state of the mobile device with respect to the second core network node is a connected state and a state of the mobile device with respect to the first core network node is an idle state.

14. A core network node comprising:
a memory;
one or more interfaces;
a processor, in communication with the one or more interfaces and capable of running instructions to be stored in the memory;
wherein the core network node is to:
communicate with a mobile device via a first radio access technology;
detect a failure of a serving gateway (SGW) for the mobile device; and
in response to the detecting the failure of the SGW, determine whether to page the mobile device based, at least in part, on a stored state of the mobile device with respect to a second core network node, the second core network node to communicate with the mobile device via a second radio access technology.

15. The core network node of claim 14, wherein the determining whether to page the mobile device is further based on a determination that the mobile device is in an active state with respect to the core network node.

16. The core network node of claim 14, wherein the core network node is further to receive from the second core network node a message indicating that the mobile device is in an active state with respect to the second core network node.

17. The core network node of claim 16, wherein the determining whether to page the mobile device comprises determining to stop paging the mobile device in response to receiving the message indicating that the mobile device is in an active state with respect to the second core network node.

18. At least one computer-readable non-transitory media comprising one or more instructions that when executed by at least one processor configure the at least one processor to cause the performance of operations comprising:
detecting a failure of a serving gateway (SGW) for a mobile device at a first core network node, the first core network node to communicate with the mobile device via a first radio access technology; and
in response to the detecting the failure of the SGW, determining whether to page the mobile device based, at least in part, on a stored state of the mobile device with respect to a second core network node, the second core network node to communicate with the mobile device via a second radio access technology.

19. The at least one media of claim 18, wherein the determining whether to page the mobile device is further based on a determination that the mobile device is in an active state with respect to the first core network node.

20. The at least one media of claim 18, the operations further comprising receiving, from the second core network node, a message indicating that the mobile device is in an active state with respect to the second core network node.

21. The at least one media of claim 20, wherein the determining whether to page the mobile device comprises determining to stop paging the mobile device in response to receiving the message indicating that the mobile device is in an active state with respect to the second core network node.

* * * * *